United States Patent
Perry, Jr. et al.

(10) Patent No.: US 6,173,735 B1
(45) Date of Patent: Jan. 16, 2001

(54) METHOD AND APPARATUS FOR REGULATING GAS FLOW

(75) Inventors: Marney Dunman Perry, Jr., Mineral Wells, TX (US); Philip J. McKibbin, Jamul, CA (US); Mick Glasscock, Horfolk (GB); John A. Krogue, Mineral Wells, TX (US)

(73) Assignee: Perry Equipment Corporation, Mineral Wells, TX (US)

( * ) Notice: Under 35 U.S.C. 154(b), the term of this patent shall be extended for 0 days.

(21) Appl. No.: 09/301,953

(22) Filed: Apr. 29, 1999

(51) Int. Cl.[7] .................................................. F16K 31/128
(52) U.S. Cl. ..................... 137/489; 137/505.12; 137/492; 137/614.21
(58) Field of Search .................................... 137/489, 492, 137/505.12, 614.21; 251/61.1

(56) References Cited

U.S. PATENT DOCUMENTS

| | | | |
|---|---|---|---|
| 3,447,569 | 6/1969 | Kreuter | 138/46 |
| 3,592,237 | 7/1971 | Borschers | 138/43 |
| 4,083,375 | 4/1978 | Johnson | 137/86 |
| 4,659,062 | 4/1987 | Mooney | 251/61.1 |
| 4,909,278 | 3/1990 | Ray | 137/505.12 |
| 5,271,601 | 12/1993 | Bonzer et al. | 251/61.1 |
| 5,520,206 | 5/1996 | Deville | 137/12 |

Primary Examiner—Gregory L. Huson
Assistant Examiner—Ramesh Krishnamurthy
(74) Attorney, Agent, or Firm—Charles D. Gunter, Jr.

(57) ABSTRACT

A pilot-operated, pressure-loaded, movable diaphragm-type gas-flow regulator valve is shown which is used in flow control applications. A regulator body internal port arrangement interconnects two independent throttling mechanisms in series. Two throttle plates are located within the regulator valve body relative to an inlet chamber and an outlet chamber. A movable diaphragm is positioned relative to a throttle plate by a separate pilot control system to vary the area of throttle plate exposed to flow, and thus, the flow rate of the regulator valve. The throttle plates each have drilled flow apertures which control flow through the valve. Smaller flow apertures are opened before larger flow apertures as the valve diaphragm lifts, thereby ensuring stability at low-flow conditions, while providing high capacity at maximum diaphragm lift. The configuration of the throttle plates, the inlet chamber, and the outlet chamber substantially reduces operational noise of the gas-flow regulator by minimizing turbulent flow within the regulator valve body.

34 Claims, 15 Drawing Sheets

METHOD AND APPARATUS FOR REGULATING GAS FLOW

BACKGROUND ART

1. Field of the Invention

The present invention relates generally to regulator valves useful in creating and maintaining a selected pressure in a gas pipe or conduit. More specifically, the present invention relates to a regulator capable of creating and maintaining two pressure reductions in series with each other within a single regulator body.

2. Description of Related Art

Regulator valves for controlling the pressure of a gas pipe or conduit are well known in the art. There are many ways to regulate the flow rate to equal demand and thus maintain a constant pressure of the gas pipe or conduit independent of inlet pressure and/or load fluctuations. In some applications, several gas-flow regulators are connected in series such that if one regulator fails to control outlet pressure the second regulator takes over control. Most regulator valves include a mechanism, such as a cage or throttle plate, for restricting the flow of the gas stream and creating the pressure drop. These cages and throttle plates usually include a variety of holes or slots through which a selected portion of the gas stream is allowed to flow by altering the position of the diaphragm. Many of these regulator valves include additional control valves for actuating the main gas-flow regulator valve.

As the technology advanced, gas-flow regulator valves began to include control valves having one or more additional pilot amplifier valves with closed-loop feedback capabilities. These pilot valves generally contained a sensing pressure chamber and an actuator that positions the pilot valve. The pressure inputs to these pilot valves could be connected to a loading chamber that is in fluid communication with the throttling diaphragm of the main regulator such that inlet pressure can be applied to the diaphragm to position the diaphragm correctly. In addition, it was not uncommon to connect more than one pilot valve to a single flow regulator. The control pressures within these pilot valves could be derived from the pressure of the gas stream upstream of the main regulator, (back pressure regulator), or the pressure of the gas stream downstream of a throttling regulator.

Despite these advances in the art, there continues to be a need for improved regulator construction and control system in order to increase efficiency, provide improved reliability, and decrease operational noise, while decreasing the cost of regulator maintenance.

BRIEF SUMMARY OF THE INVENTION

There is a need for a regulator in which two two-stage pressure drops can be performed, in series, within a single gas-flow regulator. There is also a need for a single-port regulator in which two pressure drops can be performed, in series, within the single-port gas-flow regulator. There is also a need for an improved circular throttle plate that has radial arrangements of flow apertures. There is also a need for a flexible, circular flat-bottom diaphragm of non-uniform thickness that can be configured such that the diaphragm lifts in one area before it lifts in another area for improved low-flow control and high turn-down performance.

It is an object of the present invention to provide a two-port regulator comprising an inlet chamber, a first-reduction diaphragm-controlled port chamber, a second-reduction central transfer chamber, a third-reduction diaphragm-controlled port chamber, and a fourth-reduction outlet chamber, wherein the inlet chamber and the outlet chamber both completely circumscribe the central transfer chamber. The regulator has a first throttle plate located between the inlet chamber and the first-reduction diaphragm-controlled port chamber, and between the first-reduction diaphragm-controlled port chamber and the second-reduction central transfer chamber. The regulator also has a second throttle plate located between the second-reduction central transfer chamber and the third-reduction diaphragm-controlled port chamber, and between the third-reduction diaphragm-controlled port chamber and the fourth-reduction outlet chamber. The configuration of the inlet chamber, outlet chamber, and first and second throttle plates, and the multi-stage pressure-reduction technique is designed to substantially reduce operational noise of the regulator by minimizing unstable turbulent flow within the valve body.

It is another object of the present invention to provide a single-port regulator comprising an inlet chamber, a first-reduction diaphragm-controlled port chamber, and a second-reduction outlet chamber. A single throttle plate is disposed between the inlet chamber and the first-reduction diaphragm-controlled port chamber, and between the first-reduction diaphragm-controlled port chamber and the second-reduction outlet chamber. The second-reduction outlet chamber completely circumscribes the inlet chamber adjacent to the throttle plate. The configuration of the inlet chamber, the second-reduction outlet chamber, and the throttle plate is designed to substantially reduce operational noise of the regulator by minimizing unstable turbulent flow within the valve body through the use of drilled ports that straighten the flow stream into the second-reduction outlet chamber.

It is another object of the present invention to provide a throttle plate for use in a regulator, the throttle plate having an outer ring arrangement of drilled flow apertures with three different diameters, increasing in diameter with greater distance from the center of the port and a second inner arrangement of flow apertures in the form of slots with varying lengths but constant widths. In this manner, because the diaphragm is designed to open in the center first, the smaller diameter drilled apertures in the outer ring arrangement of drilled apertures, are opened before the larger diameter drilled apertures in the outer ring arrangement of drilled apertures, thereby insuring stability at low-flow conditions, while providing high capacity at maximum diaphragm lift. The throttle plate is configured such that the gas stream flows radially parallel to the throttle plate either from a center to a periphery for the two-port outlet throttle plate, or from the periphery to the center for the two-port inlet throttle plate.

It is another object of the present invention to provide a flexible circular diaphragm of non-uniform thickness for use in a gas-flow regulator, the flexible diaphragm having a flat front surface for sealing flow apertures in a throttle plate, and an opposing rear surface having a central concave portion that allows the diaphragm to unseal the flow apertures from the center portion of the throttle plate before unsealing the flow apertures at the periphery of the throttle plate. For throttle plates with an outer ring arrangement of flow apertures with multiple diameters, increasing in diameter with greater distance from the center of a port; as the flexible diaphragm opens the innermost ring of flow apertures, while keeping other rings of flow apertures closed, an incremental decrease of a loading pressure on the flexible diaphragm will yield a relatively small incremental increase in flow rate, compared with the same incremental decrease of the loading pressure as the remaining flow apertures, having increasingly larger diameters, are opened. The number of rings of flow apertures in the outer ring arrangement is limited only by the port area available and aperture diameter. The diaphragm lift is controlled by a bias spring disposed within a loading chamber, and a loading chamber pressure differential. The bias spring and the loading chamber pressure allow a higher inlet pressure to lift the flexible diaphragm in proportion to the differential pressure across the flexible diaphragm and the bias spring rate. The loading chamber pressure is controlled remotely by a pilot amplifier valve that lowers the loading pressure, thereby allowing the flexible diaphragm to open, and increase flow, if required.

It is another object of the present invention to provide a control system for controlling a gas-flow regulator, the control system comprising at least one multi-chamber control valve having a pilot valve, the control valve being in fluid communication with the gas stream and the gas-flow regulator.

It is another object of the present invention to provide a control system for controlling a gas-flow regulator in a pipeline, the control system comprising at least one multi-chamber control valve having a pilot valve, the control valve being in fluid communication with an inlet gas stream from the pipeline, a regulator loading chamber, a regulator outlet, and a remote sensing point on the pipeline.

A principle advantage of the present invention is to maximize the flow area of a throttle plate for a given total length of a regulator by using a circular port at an inlet chamber/throttle plate interface and an annular port at a throttle plate/outlet chamber interface. The annular port at the throttle plate/outlet chamber interface provides an increased area on the throttle plate that allows for arrangements of drilled ports of various sizes to pass through the throttle plate. One such arrangement of drilled ports is a circular arrangement of drilled ports in which small-diameter ports are located radially inward of large-diameter ports. Such an arrangement used in conjunction with a flexible diaphragm, allows the flexible diaphragm to open smaller inner ports before opening progressively larger perimeter ports. Additionally, because the flexible diaphragm may lift completely off of the throttle plate at maximum lift, high regulator capacity may be achieved, while maintaining excellent control and turn-down capability at reduced lift positions.

Another advantage of the present invention is that four separate pressure drops, in series, can be performed on the gas stream by a single gas-flow regulator, thereby minimizing the potential of icing caused by the Joule-Thompson cooling effect; and, thus, potentially eliminating the need for additional anti-icing devices. In addition, performing a large pressure drop over four separate stages in series, as opposed to a conventional single two-stage pressure drop, reduces the operational noise and wear on the diaphragm's wetted surfaces associated with a large pressure drop.

Another advantage of the present invention is a 100% increase in operational safety factor associated with the addition of a second throttling chamber operating in series within the regulator body, that can take over control if the one port fails.

The above as well as additional objects, features, and advantages of the invention will become apparent in the following detailed description.

DETAILED DESCRIPTION OF THE PREFERRED EMBODIMENT

Figure 1:
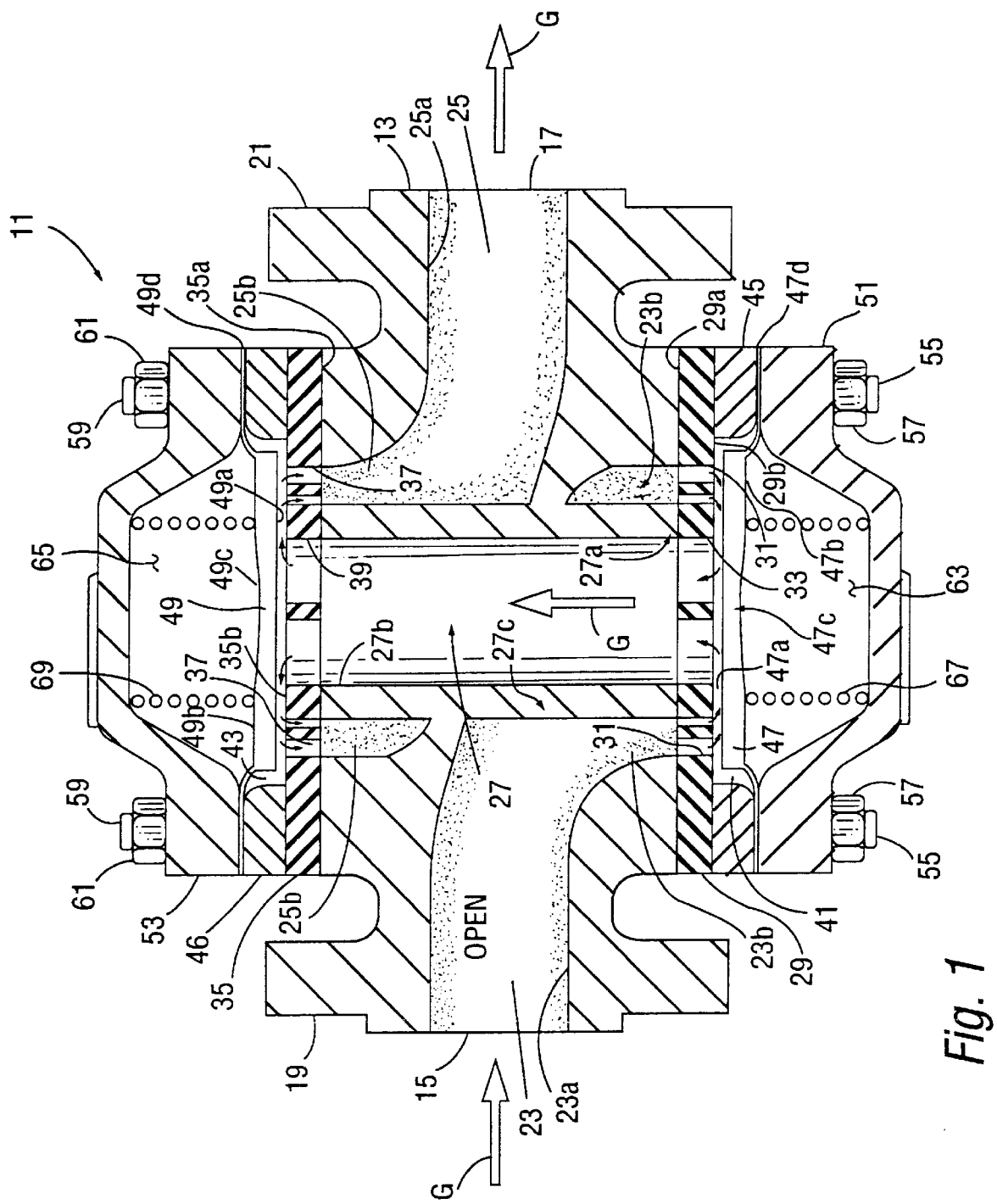
FIG. 1 is a cross-sectional view of a gas-flow regulator of the present invention.

Referring to FIG. 1 of the drawings, numeral 11 illustrates the preferred embodiment of a series double-port gas-flow regulator of the present invention. Regulator 11 includes a longitudinal valve body 13 having an inlet port 15 for receiving a flow of a gas stream, indicated by arrows G, and an opposing outlet port 17, through which the regulated gas stream G is exhausted. Valve body 13 has an inlet flange 19 surrounding inlet port 15, and an outlet flange 21 surrounding outlet port 17. Inlet flange 19 and outlet flange 21 are configured such that regulator 11 may be installed into a conventional gas pipeline. An inlet chamber 23 is in fluid communication with inlet port 15. An outlet chamber 25, preferably mirrors in reverse symmetry inlet chamber 23, is in fluid communication with outlet port 17. A central transfer chamber 27 extends transversely across valve body 13.

Central transfer chamber is preferably circular in cross-section, but may have other geometrical cross-sections, such as elliptical. Inlet chamber 23 includes a cylindrical portion 23a that extends longitudinally into valve body 13 from inlet port 15, and an annular portion 23b that extends transverse to valve body 13. Similarly, outlet chamber 25 includes a cylindrical portion 25a that extends longitudinally into valve body 13 from outlet port 17, and an annular portion 25b that extends transverse to valve body 13, but in the opposite direction of annular portion 23b. Further, annular portion 23b of inlet chamber 23 and annular portion 25b of outlet chamber 25 both are coaxial with, and complete circumscribe central transfer chamber 27. Annular portion 23b and annular portion 25b may be of other crosssections, depending upon the geometrical cross-section of central transfer chamber 27.

Central transfer chamber 27 has a first tubular end 27a and an opposing second tubular end 27b. First tubular end 27a of central transfer chamber 27 and annular portion 23b of inlet chamber 23 both terminate at a first throttle plate 29. First throttle plate 29 is preferably circular in shape and made of rigid material, such as steel or any other suitable material. First throttle plate 29 has a front surface 29a and an opposing rear surface 29b. First throttle plate 29 includes a first arrangement of flow apertures 31 that pass axially through first throttle plate 29, and a second arrangement of flow apertures 33 that also pass axially through first throttle plate 29. First arrangement of flow apertures 31 is generally located radially outward from second arrangement of flow apertures 33. First throttle plate 29 will be explained in more detail below with respect to FIG. 2. As will be explained below, front surface 29a of first throttle plate 29 is sealingly coupled to valve body 13.

Second tubular end 27b of central transfer chamber 27 and annular portion 25b of outlet chamber 25 both terminate at a second throttle plate 35. Second throttle plate 35 is preferably circular in shape and made of a rigid material, such as steel or any other suitable material. Second throttle plate 35 has a front surface 35a and an opposing rear surface 35b. Second throttle plate 35 includes a first arrangement of flow apertures 37 that pass axially through second throttle plate 35, and a second arrangement of flow apertures 39 that also pass axially through second throttle plate 35. First arrangement of flow apertures 37 is generally located radially outward from second arrangement of flow apertures 39. Second throttle plate 35 will be explained in more detail below with respect to FIG. 3. As will be explained below, front surface 35a of second throttle plate 35 is sealingly coupled to valve body 13.

A first reduction chamber 41 is in fluid communication with annular portion 23b of inlet chamber 23, via first arrangement of flow apertures 31 in first throttle plate 29. In addition, first reduction chamber 41 is in fluid communication with a second reduction chamber, or central transfer chamber 27, via second arrangement of flow apertures 33 in first throttle plate 29. In a symmetrical fashion, a third reduction chamber 43 is in fluid communication with a fourth reduction chamber, or annular portion 25b of outlet chamber 25, via first arrangement of flow apertures 37 in second throttle plate 35. Also, third reduction chamber 43 is in fluid communication with central transfer chamber 27, via second arrangement of flow apertures 39 in second throttle plate 35.

A first spacer ring 45 is sealingly coupled to rear surface 29b of first throttle plate 29. First spacer ring 45 is preferably made of a rigid material, such as steel or other comparable material. First spacer ring 45 serves to locate a first flexible diaphragm 47 over first arrangement of flow apertures 31 in first throttle plate 29, and second arrangement of flow apertures 33 in first throttle plate 29. A second spacer ring 46 is sealingly coupled to rear surface 35b of second throttle plate 35. Second spacer ring 46 is preferably made of a rigid material, such as steel or other comparable material. Second spacer ring 46 serves to locate a second flexible diaphragm 49 over first arrangement of flow apertures 37 in second throttle plate 35, and second arrangement of flow apertures 39 in second throttle plate 35.

Continuing with reference to FIG. 1, first flexible diaphragm 47 is preferably circular in shape and made of nitrile, vyton, nylon, or any other natural gas impermeable material suitable for flexible diaphragms. First flexible diaphragm 47 has a flat front surface 47a that flushly mates with rear surface 29b of first throttle plate 29, and releasably seals both first arrangement of flow apertures 31 of first throttle plate 29 and second arrangement of flow apertures 33 of first throttle plate 29. First flexible diaphragm 47 has a rear surface 47b opposite front surface 47a. Rear surface 47b of first flexible diaphragm 47 is generally flat, but includes a central concave portion 47c. Central concave portion 47c allows first flexible diaphragm 47 to lift from rear surface 29b of first throttle plate 29 from the center radially outward, thereby opening second arrangement of flow apertures 33 before opening first arrangement of flow apertures 31. First flexible diaphragm 47 includes a thin, peripheral portion 47d that is sealingly disposed between first spacer ring 45 and a first diaphragm casing 51.

Second flexible diaphragm 49 is preferably identical to first flexible diaphragm, and as such, is preferably circular in shape and made of nitrile, vyton, nylon, or any other natural gas impermeable material suitable for flexible diaphragms. Second flexible diaphragm 49 has a flat front surface 49a that flushly mates with rear surface 35b of second throttle plate 35, and releasably seals both first arrangement of flow apertures 37 of second throttle plate 35 and second arrangement of flow apertures 39 of second throttle plate 35. Second flexible diaphragm 49 has a rear surface 49b opposite front surface 49a. Rear surface 49b of second flexible diaphragm 49 is generally flat, but includes a central concave portion 49c. Central concave portion 49c allows second flexible diaphragm 49 to lift from rear surface 35b of second throttle plate 35 from the center radially outward, thereby opening second arrangement of flow apertures 39 before opening first arrangement of flow apertures 37. Second flexible diaphragm 49 includes a thin, peripheral portion 49d that is sealingly disposed between second spacer ring 46 and a second diaphragm casing 53.

Figure 2:
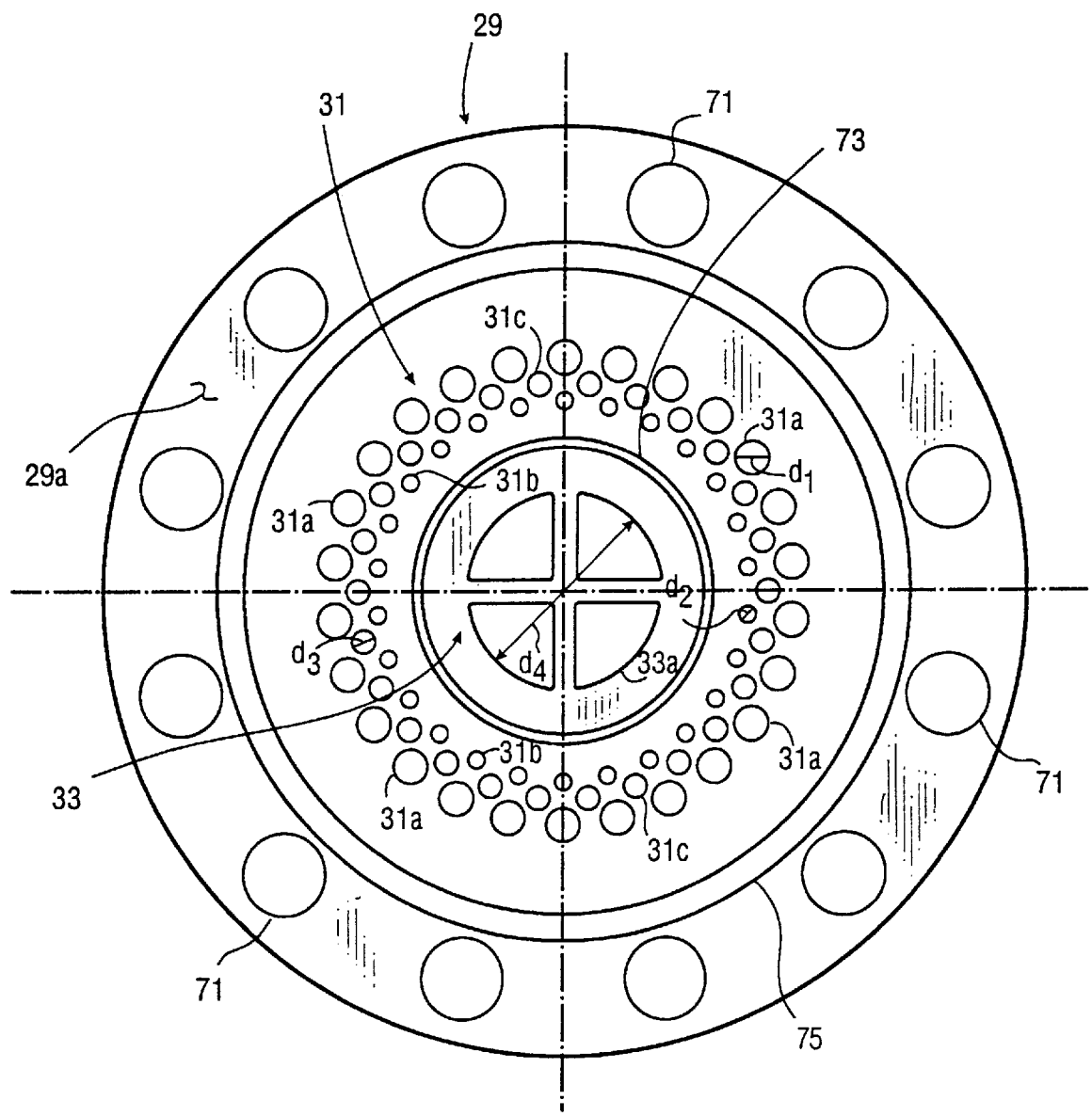
FIG. 2 is a plan view of a first throttle plate of the gas-flow regulator of FIG. 1.

Continuing with reference to FIG. 1, a plurality of lugs 55 extend outward from valve body 13 and through aligned apertures in first diaphragm casing 51, peripheral portion 47d of first flexible diaphragm 47, first spacer ring 45, and first throttle plate 29 (see 71 in FIG. 2). Fastening means, such as nuts 57, tighten about lugs 55 and sealingly compress first diaphragm casing 51, peripheral portion 47d of first flexible diaphragm 47, first spacer ring 45, and first throttle plate 29 together. Likewise, a plurality of lugs 59 extend outward from valve body 13 and through aligned apertures in second diaphragm casing 53, peripheral portion 49d of second flexible diaphragm 49, second spacer ring 46, and second throttle plate 35 (see 77 in FIG. 3). Fastening means 61 tighten about lugs 59 and sealingly compress second diaphragm casing 53, peripheral portion 49d of second flexible diaphragm 49, second spacer ring 46, and second throttle plate 35 together.

Thus, first reduction chamber 41 is defined by rear surface 29b of first throttle plate 29, front surface 47a of first flexible diaphragm 47, peripheral portion 47d of first flexible diaphragm 47, and first spacer ring 45. In a similar manner, third reduction chamber 43 is defined by rear surface 35b of second throttle plate 35, front surface 49a of second flexible diaphragm 49, peripheral portion 49d of second flexible diaphragm 49, and second spacer ring 46. In addition, a first loading chamber 63 is defined by first diaphragm casing 51, rear surface 47b of first flexible diaphragm 47, and peripheral portion 47d of first flexible diaphragm 47. Likewise, a second loading chamber 65 is defined by second diaphragm casing 53, rear surface 49b of second flexible diaphragm 49, and peripheral portion 49d of second flexible diaphragm 49.

An adjustable pressure load exists in first loading chamber 63, the adjustable pressure load bearing upon rear surface 47b of first flexible diaphragm 47, thereby forcing front surface 47a of first flexible diaphragm 47 against rear surface 29b of first throttle plate 29. An adjustable pressure load also exists in second loading chamber 65, the adjustable pressure load bearing upon rear surface 49b of second flexible diaphragm 49, thereby forcing front surface 49a of second flexible diaphragm 49 against rear surface 35b of second throttle plate 35. As will be explained in more detail below, the adjustable pressure load in first loading chamber 63 and the adjustable pressure load in second loading chamber 65 may be derived from the same source, and therefore, be identical, or the adjustable pressure loads may be derived from separate and distinct sources; and, therefore, may be different.

A first actuator spring 67 of selected preload is disposed within first loading chamber 63. First actuator spring 67 is seated against first diaphragm casing 51, and biases front surface 47a of first flexible diaphragm 47 against rear surface 29b of first throttle plate 29, thereby contributing to the adjustable pressure load in first loading chamber 63. Similarly, a second actuator spring 69 of selected preload is disposed within second loading chamber 65. Second actuator spring 69 is seated against second diaphragm casing 53, and biases front surface 49a of second flexible diaphragm 49 against rear surface 35b of second throttle plate 35, thereby contributing to the adjustable pressure load in second loading chamber 65.

Referring now to FIG. 2 in the drawings, first throttle plate 29 is illustrated in a plan view looking down at front surface 29a. As described above, apertures 71 are arranged around the periphery of first throttle plate 29 and are aligned with lugs 55 of valve body 13. As is shown, first arrangement of flow apertures 31 in first throttle plate 29 is located radially outward of second arrangement of flow apertures 33. An annular first seal seat 73 is located on front surface 29a of first throttle plate 29 between first arrangement of flow apertures 31 and second arrangement of flow apertures 33. First seal seat 73 is preferably a square groove, but may be of a different geometrical cross-section, such as a semi-circle. First seal seat 73 is adapted to receive a conventional seal, such as an O-ring (not shown). First seal seat 73 and the associated seal provide a fluid-tight seal between front surface 29a of first throttle plate 29 and valve body 13 between annular portion 23b of inlet chamber 23 and central transfer chamber 27. Thus, first seal seat 73 and the associated seal prevent leakage of gas stream G from annular portion 23b of inlet chamber 23 to central transfer chamber 27.

An annular second seal seat 75 is located on front surface 29a of first throttle plate 29 between first arrangement of flow apertures 31 and apertures 71. Second seal seat 75 is preferably a square groove, but may be of a different geometrical cross-section, such as a semi-circle. Second seal seat 75 is adapted to receive a conventional seal, such as an O-ring (not shown). Second seal seat 75 and the associated seal provide a fluid-tight seal between front surface 29a of first throttle plate 29 and valve body 13. Second seal seat 75 and the associated seal provide a fluid-tight seal against valve body 13 exterior to annular portion 23b of inlet chamber 23. Thus, second seal seat 75 and the associated seal prevent leakage of gas stream G from annular portion 23b of inlet chamber 23 to the outside of valve body 13.

An annular third seal seat (not shown) is located on rear surface 29b of first throttle plate 29 directly opposite second seal seat 75. Third seal seat is preferably a square groove, but may be of a different geometrical cross-section, such as a semi-circle. Third seal seat is adapted to receive a conventional seal, such as an O-ring(not shown). Third seal seat and the associated seal provide a fluid-tight seal between rear surface 29b of first throttle plate 29 and first spacer ring 45 exterior to first arrangement of Ifow apertures 31. Thus, third seal seat and the associated seal prevent leakage of gas stream G from first reduction chamber 41 to the outside of valve body 13.

Continuing with reference to FIG. 2, first arrangement of flow apertures 31 preferably consists of a plurality of concentric circular arrays of flow apertures. An outer circular array of outer apertures has a selected outer array diameter, and consists of individual outer apertures 31a, each outer aperture 31a having a selected outer aperture diameter of $d_1$. An inner circular array of inner apertures has a selected inner array diameter, and consists of individual inner apertures 31b, each inner aperture 31b having a selected inner aperture diameter of $d_2$. At least one intermediate circular array of intermediate apertures has a selected intermediate array diameter, and consists of individual intermediate apertures 31c, each intermediate aperture 31c having a selected intermediate aperture diameter of $d_3$. It is preferable that $d_1$ be greater than $d_2$, and that $d_2$ be greater than $d_3$. If more than one intermediate circular array of intermediate apertures is present, than the intermediate aperture diameter (analogous to $d_3$) of the individual intermediate apertures of each successive intermediate circular array of intermediate apertures should be greater than the intermediate aperture diameter of the intermediate apertures of the next innermost circular array of intermediate apertures. In more general terms, it is preferable that small-diameter flow apertures are closer to the center of first throttle plate 29, and large-diameter flow apertures are closer to the periphery of first throttle plate 29.

Because first flexible diaphragm 47 lifts from the center outward, small-diameter flow apertures, such as inner apertures 31b, will be opened before large-diameter flow apertures, such as outer apertures 31a. By opening inner apertures 31b before outer apertures 31a, control and turndown are optimized, thereby insuring stability at low flow rates, while providing high flow capacity at maximum diaphragm lift. In addition, it is preferable that the concentric circular arrays of apertures 31a, 31b, and 31c be staggered such that some overlap between adjacent concentric circular arrays exists. This means that as first flexible diaphragm 47 opens outward, the next outermost circular array of apertures is partially opened before the next inner most circular array of apertures is completely opened. This increases the stability of regulator 11.

Second arrangement of flow apertures 33 preferably consists of a central array of central apertures 33a. Central array of central apertures 33a has a central diameter of $d_4$. Central array of central apertures 33a is located interior to first arrangement of flow apertures 31 and first seal seat 73.

Although central array of central apertures 33a is shown as a single large aperture divided into four quadrants, it should be understood that other patterns of apertures may perform equally well. It is preferred that the combined area of central array of central apertures 33a be equal to or larger than the combined area of flow apertures 31a, 31b, and 31c, for this results in 100% flow capacity. It should be understood that by adjusting the number, size, and shape of flow apertures 31a, 31b, 31c, and 33a, first throttle plate 29 may be configured to allow 100% flow capacity, or restrict flow capacity to ratings below 100%.

Figure 3:
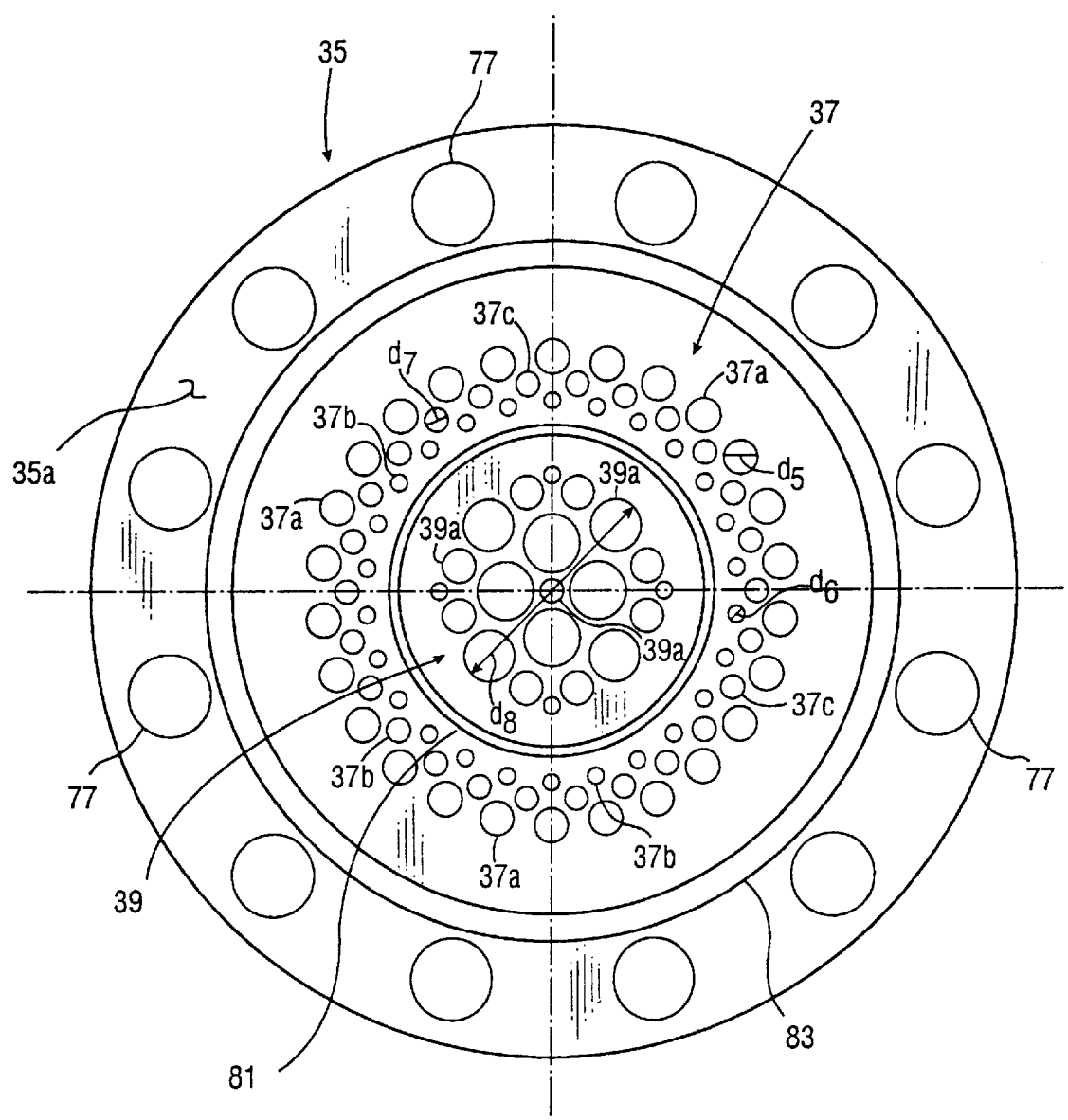
FIG. 3 is a plan view of a second throttle plate of the gas-flow regulator of FIG. 1.

Referring now to FIG. 3 in the drawings, second throttle plate 35 is illustrated in a plan view looking down at front surface 35a. As described above, apertures 77 are arranged around the periphery of second throttle plate 35 and are aligned with lugs 55 of valve body 13. As is shown, first arrangement of flow apertures 37 in second throttle plate 35 is located radially outward of second arrangement of flow apertures 39. An annular first seal seat 81 is located on front surface 35a of second throttle plate 35 between first arrangement of flow apertures 37 and second arrangement of flow apertures 39. First seal seat 81 is preferably a square groove, but may be of a different geometrical cross-section, such as a semi-circle. First seal seat 81 is adapted to receive a conventional seal, such as an O-ring (not shown). First seal seat 81 and the associated seal provide a fluid-tight seal between front surface 35a of second throttle plate 35 and valve body 13 between annular portion 25b of outlet chamber 25 and central transfer chamber 27. Thus, first seal seat 81 and the associated seal prevent leakage of gas stream G from central transfer chamber 27 to annular portion 25b of outlet chamber 23.

An annular second seal seat 83 is located on front surface 35a of second throttle plate 35 between first arrangement of flow apertures 37 and apertures 77. Second seal seat 83 is preferably a square groove, but may be of a different geometrical cross-section, such as a semi-circle. Second seal seat 83 is adapted to receive a conventional seal, such as an O-ring (not shown). Second seal seat 83 and the associated seal provide a fluid-tight seal between front surface 35a of second throttle plate 35 and valve body 13. Second seal seat 83 and the associated seal provide a fluid-tight seal against valve body 13 exterior to annular portion 25b of outlet chamber 25. Thus, second seal seat 83 and the associated seal prevent leakage of gas stream G from annular portion 25b of outlet chamber 25 to the outside of valve body 13.

An annular third seal seat 83a (see FIG. 7) is located on rear surface 35b of second throttle plate 35 directly opposite second seal seat 83. Third seal seat 83a is preferably a square groove, but may be of a different geometrical cross-section, such as a semi-circle. Third seal seat 83a is adapted to receive a conventional seal, such as an O-ring (not shown). Third seal seat 83a and the associated seal provide a fluid-tight seal between rear surface 35b of second throttle plate 35 and second spacer ring 46 exterior to first arrangement of flow apertures 37. Thus, third seal seat 83a and the associated seal prevent leakage of gas stream G from third reduction chamber 43 to the outside of valve body 13.

Continuing with reference to FIG. 3, first arrangement of flow apertures 37 preferably consists of a plurality of concentric circular arrays of flow apertures. An outer circular array of outer apertures has a selected outer array diameter, and consists of individual outer apertures 37a, each outer aperture 37a having a selected outer aperture diameter of $d_5$. An inner circular array of inner apertures has a selected inner array diameter, and consists of individual inner apertures 37b, each inner aperture 37b having a selected inner aperture diameter of $d_6$. At least one intermediate circular array of intermediate apertures has a selected intermediate array diameter, and consists of individual intermediate apertures 37c, each intermediate aperture 37c having a selected intermediate aperture diameter of $d_7$. It is preferable that the $d_5$ be greater than $d_6$, and that $d_6$ be greater than $d_7$. If more than one intermediate circular array of intermediate apertures is present, than the intermediate aperture diameter (analogous to $d_7$) of the individual intermediate apertures of each successive intermediate circular array of intermediate apertures should be greater than the intermediate aperture diameter of the intermediate apertures of the next innermost circular array of intermediate apertures. In more general terms, it is preferable that small-diameter flow apertures are closer to the center of second throttle plate 35, and large-diameter flow apertures are closer to the periphery of first throttle plate 35.

Because second flexible diaphragm 49 lifts from the center outward, small-diameter flow apertures, such as inner apertures 37b, will be opened before large-diameter flow apertures, such as outer apertures 37a. By opening inner apertures 37b before outer apertures 37a, control and turndown are optimized, thereby insuring stability at low flow rates, while providing high flow capacity at maximum diaphragm lift. It is preferable that the concentric circular arrays of apertures 37a, 37b, and 37c be staggered such that some overlap between adjacent concentric circular arrays exists. This means that as second flexible diaphragm 49 opens outward, the next outermost circular array of apertures is partially opened before the next inner most circular array of apertures is completely opened. This increases the stability of regulator 11.

Second arrangement of flow apertures 39 preferably consists of a central array of central apertures 39a. Central array of central apertures 39a has a central diameter of $d_8$. Central array of central apertures 39a is located interior to first arrangement of flow apertures 37 and first seal seat 81. It should be understood that patterns of apertures other than the one shown may perform equally well. It is preferred that the combined area of central apertures 39a be equal to or larger than the combined area of flow apertures 37a, 37b, and 37c, for this results in 100% flow capacity. It should be understood that by adjusting the number, size, and shape of the flow apertures 37a, 37b, 37c, and 39a, second throttle plate 35 may be configured to allow 100% flow capacity, or restrict flow capacity to ratings below 100%.

Referring now to FIGS. 4, 5, 6A, and 6B in the drawings, regulator 11 is shown connected to a closed-looped control system 100. Control system 100 includes a control valve 101 having a body 102, a supply chamber 103, an exhaust chamber 105, an exhaust port 105a, a sensing chamber 106, a sensing port 106a, a reversible pilot valve 104 installed in supply chamber 103 or exhaust chamber 105, a stem seal 105c, a spring case 107a, a threaded spring case cap 107b, an adjustable control spring 107, and a control pressure adjustment member 108. Supply chamber 103 has a first supply port 103a and a second supply port 103b, and contains an adjustable supply pressure. Pilot valve 104 and a removable port assembly 103f are configured such that supply chamber 103 and exhaust chamber 105 are isolated from each other when pilot valve 104 is closed; and such that gas may flow from supply chamber 103 into exhaust chamber 105 when pilot valve 104 is opened. Supply chamber 103 is accessible via a threaded end cap 103c that contains a pilot valve guide 103d, and a pilot stem return spring 103e. Removable port assembly 103f has a port assembly locating spring 103g and valve seats on supply and exhaust sides for reversible pilot action. Removable port assembly 103f includes a seal groove 103h of square cross-section for receiving a conventional O-ring or other suitable seal. In this manner, supply chamber 103 is sealed from exhaust chamber 105 relative to body 102. Stem seal 105c is mounted in body 102 to located and guide pilot valve 104, and seal exhaust chamber 105 from sensing chamber 106.

Figure 4:
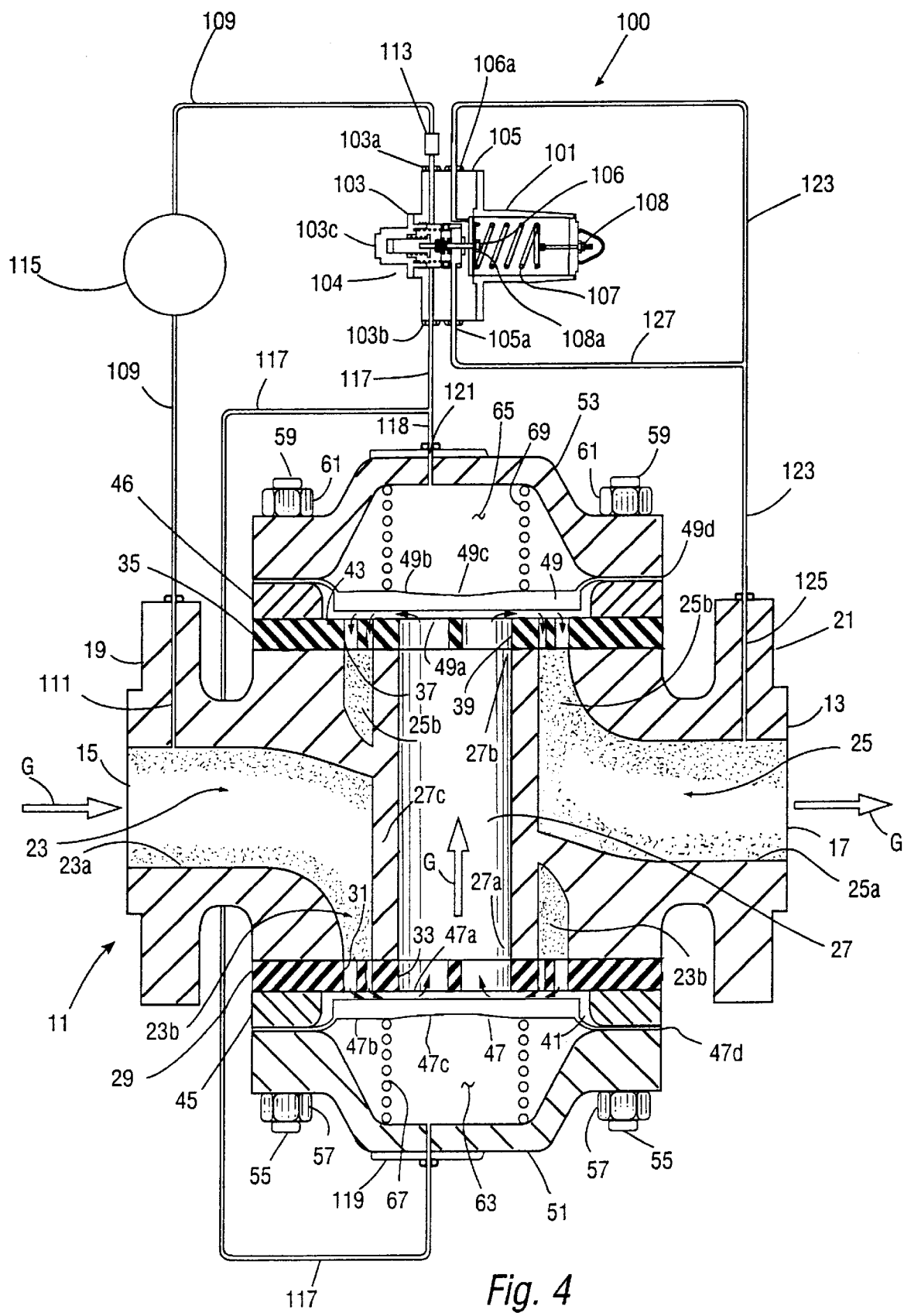
FIG. 4 is a cross-sectional view of the gas-flow regulator of FIG. 1 with a closed-loop control system having a single, reversible control valve, in which the control system is passive.
Figure 5:
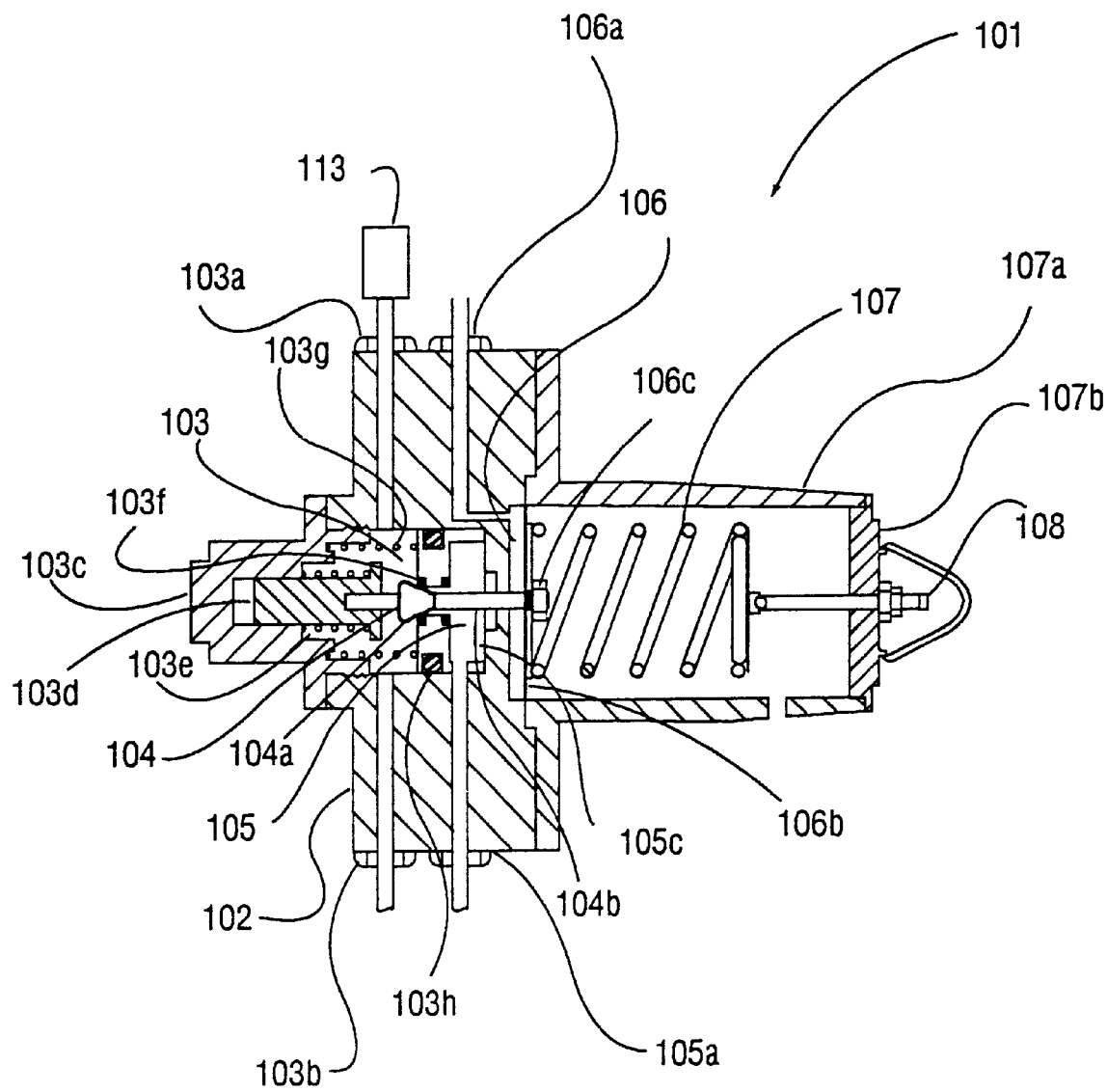
FIG. 5 is an enlarged cross-sectional view of the control valve of FIG. 4.
Figure 6:
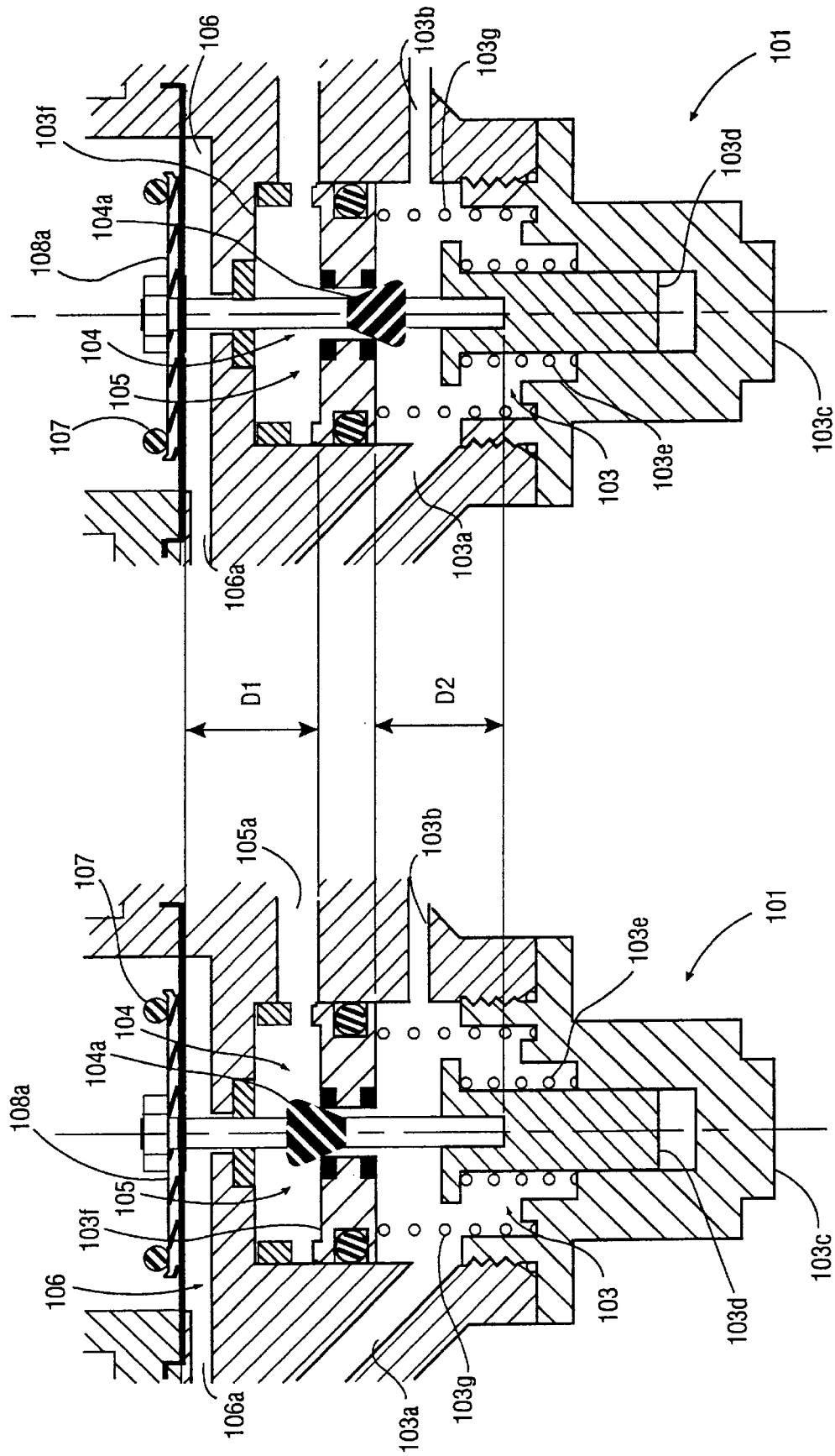
FIGS. 6A and 6B are further enlarged cross-sectional views of the control valve of FIG. 1 illustrating the reversible feature of the control valve.

As best seen in FIGS. 6A and 6B, pilot valve 104 is configured to have a first length D1 that is equal to a second length D2. This allows pilot valve 104 to be installed in control valve 101 in one of two directions. As shown in FIGS. 4, 5, and 6B, pilot valve 104 is installed in control valve 101 such that a valve portion 104a of pilot valve 104 is disposed within supply chamber 103, thereby making control valve 101 a "regulating pilot." On the other hand, as shown in FIG. 6A, if valve portion 104a of pilot valve 104 is reversed and is disposed in exhaust chamber 105, control valve 101 is a back-pressure "relief pilot." Exhaust chamber 105 is in fluid communication with exhaust port 105a, and holds an exhaust pressure equal to regulator outlet pressure. A selected control pressure is exerted by control pressure adjustment member 108 on a control diaphragm 106b that is in fluid communication with sensing chamber 106.

A supply conduit 109 is connected to first supply port 103a of supply chamber 103 and an inlet flange tap 111 in inlet flange 19 of regulator 11, thereby placing supply chamber 103 of control valve 101 into fluid communication with inlet chamber 23 of regulator 11. A restrictor member 113 is disposed in supply conduit 109 near control valve 101. Restrictor member 113 includes an orifice (not shown) of variable or fixed flow diameter that is smaller than the flow diameter of supply conduit 109, such that restrictor member 113 restricts the flow of gas from inlet chamber 23 into supply chamber 103, and ensures that gas may be exhausted through port assembly 103f faster than restrictor 113 can supply gas to supply chamber 103 of pilot valve 101. An optional filter member 115 may be installed in supply conduit 109 between inlet flange tap 111 and restrictor member 113 to prevent solids in gas stream G from clogging or fouling control valve 101.

Spring case 107a is attached to body 102 with four or more bolts (not shown). Diaphragm 106b is used to seal sensing chamber 106 from external leakage. Diaphragm 106b also acts to transmit movement to a stem portion 104b of pilot valve 104 from changes in sensing chamber 106 pressure. An increase in sensing chamber 106 pressure causes diaphragm 106b to move toward spring case 107a, against the load of adjustable control spring 107. A decrease in sensing chamber 106 pressure causes diaphragm 106b to move away from spring case 107a, with the load of adjustable control spring 107. Stem portion 104b movement translates into an opening or closing action relative to removable port assembly 103f. When set point of spring 107 is equal to a sense pressure, in sensing chamber 106, valve portion 104a is seated against removable port assembly 103f and there is no flow into exhaust chamber 105. This causes full inlet pressure to exist in supply chamber 103 as well as in each loading chamber that supply chamber 103 is in fluid communication with, thus causing regulator 11 to close. As load increases, and sensing chamber 106 pressure decreases, diaphragm 106b will move toward body 102 and open pilot valve 104, assuming pilot stem 104b is in a regulating position. As pilot valve 104 opens, flow increases through supply chamber 103 into exhaust chamber 105 and vented into outlet chamber 25. This increased flow rate causes a pressure drop through restrictor 113, and thus lowers the pressure in supply chamber 103 as well as each loading chamber that supply chamber 103 is in fluid communication with. This action results in regulator 11 opening incrementally to supply the load until a steady state is reached, whereby the load equals supply and the pilot and regulator diaphragm positions are static. The gain of pilot valve 104 is proportional to the effective area of diaphragm 106b and spring rate of adjustable control spring 107, and is also effected by the flow capacity difference of restrictor 113 and pilot valve 104.

External sense line 123 is in fluid communication with sensing chamber 106 via sensing port 106a. A spring seat assembly 106c serves to locate adjustable control spring 107 relative to diaphragm 106b and reinforce diaphragm 106b against the sense pressure, thereby allowing only the outer periphery of diaphragm 106b to move. Spring seat assembly 106c is held in place with a threaded fastener that extends through an aperture at the center of diaphragm 106b into spring case 107a and seals both sides of diaphragm 106b against leakage from sensing chamber 106 into spring case 107a.

Because restrictor member 113 is preferably of fixed flow capacity, and pilot valve 104 is of variable, and higher flow capacity than restrictor member 113, pilot valve 104 functions as a pressure amplifier, transforming small outlet pressure changes into relatively large movements of first diaphragm 47 and second diaphragm 49. It should be understood that this multiplier effect will be different depending on the characteristics of pilot valve 104, such as flow capacity, and the characteristics of restrictor member 113, such as orifice size and flow capacity. Thus, pilot valve 104 can always vent loading pressure into outlet 25 faster than loading pressure can be supplied through restrictor member 113. As flow through pilot valve 104 increases, the pressure between restrictor member 113 and first supply port 103a is reduced because of a pressure drop across restrictor 113. Therefore, a pilot gain is the ratio of pilot-valve flow capacity to restrictor-member flow capacity. Thus, as gas flow through restrictor member 113 is adjusted downward by selecting a smaller flow diameter for the fixed orifice of restrictor member 113, the pilot gain is increased. In addition, a speed of response of regulator 11 is increased by selecting a smaller flow diameter for the fixed orifice of restrictor member 113.

A first loading conduit 117 is connected to second supply port 103b of supply chamber 103 and a first loading chamber tap 119 in first diaphragm casing 51, thereby placing supply chamber 103 into fluid communication with first loading chamber 63. A second loading conduit 118 is interconnected with first loading conduit 117 and is further connected to a second loading chamber tap 121 in second diaphragm casing 53, thereby placing supply chamber 103 into fluid communication with second loading chamber 65. In this manner, the adjustable pressure load in first loading chamber 63 and the adjustable pressure load in second loading chamber 65 are equal, and may be simultaneously regulated by the supply pressure in supply chamber 103. A sensing conduit 123 is connected to sensing port 106a of sensing chamber 106 and an outlet flange tap 125 in outlet flange 21 of regulator 11, thereby placing sensing chamber 106 into fluid communication with outlet chamber 25. Sensing conduit 123 may also be connected to an external pipeline connection. Exhaust chamber 105 is also in fluid communication with outlet chamber 25 by way of a venting conduit 127 that is connected to exhaust port 105a of exhaust chamber 105. In this manner, exhaust pressure in exhaust chamber 105 may be vented into outlet chamber 25. Also, if pilot valve 104 is opened, supply pressure and loading pressure from both first loading chamber 63 and second loading chamber 65 may be vented into outlet chamber 25, thereby lowering the pressure in the both first loading chamber 63 and second loading chamber 65, and allowing both first flexible diaphragm 47 and second flexible diaphragm 49 to open.

Continuing with reference to FIGS. 4, 5, 6A, and 6B, operation of control system 100 is as follows. Control valve 101 is set to a selected control pressure by adjustment of control pressure adjustment member 108. When sense pressure and selected control pressure are equal, pilot valve 104 is closed, and there is no flow of gas between supply chamber 103 and exhaust chamber 105. Under no-flow conditions, inlet pressure from inlet chamber 23 is communicated to supply chamber 103 through supply conduit 109, restrictor member 113, and filter member 115. Further, because pilot valve 104 is closed, the supply pressure in supply chamber 103 is communicated to first loading chamber 63 through first loading conduit 117, and the supply pressure in supply chamber 103 is communicated to second loading chamber 65 through second loading conduit 118. Thus, under no-flow conditions, the pressures in supply chamber 103, first loading chamber 63, and second loading chamber 65 are equal and the same as the pressure in inlet chamber 23. Under such conditions, front surface 47a of first flexible diaphragm 47 is fully compressed against rear surface 29b of first throttle plate 29, thereby sealing off first arrangement of flow apertures 31 and second arrangement of flow apertures 33. Therefore, gas stream G may not flow from annular portion 23b of inlet chamber 23 into first reduction chamber 41. Likewise, front surface 49a of second flexible diaphragm 49 is fully compressed against rear surface 35b of second throttle plate 35, thereby sealing off first arrangement of flow apertures 37 and second arrangement of flow apertures 39. Therefore, gas stream G may not flow from central transfer chamber 27 into third reduction chamber 43.

As downstream flow begins to increase from a no-flow condition, pressure in outlet chamber 25 decreases. Any pressure decrease in outlet chamber 25 is communicated to sensing chamber 106 through sensing conduit 123. If the pressure in outlet chamber 25 is below the selected control pressure set by control pressure adjustment member 108, pilot valve 104 will open. As pilot valve 104 opens, loading pressure from both first loading chamber 63 and second loading chamber 65 is vented through supply chamber 103, through exhaust chamber 105, and into outlet chamber 25 via vent line 127. This happens because loading pressure from first loading chamber 63 and second loading chamber 65 can be vented faster than supply pressure can be replenished to supply chamber 103 through restrictor member 113. When loading pressure from first loading chamber 63 is reduced, first flexible diaphragm 47 begins to lift away from first throttle plate 29 from the center outward, thereby opening second arrangement of flow apertures 33 followed by first arrangement of flow apertures, starting with small-diameter inner apertures 31b, then intermediate apertures 31c, and finally outer apertures 31a (see FIG. 2). By opening in this manner, first flexible diaphragm provides and maintains regulator stability.

Once first arrangement of flow apertures 31 in first throttle plate 29 is opened, gas stream G flows from annular portion 23b of inlet chamber 23 through first arrangement of flow apertures 31 into first reduction chamber 41. After gas stream G enters first reduction chamber 41, first flexible diaphragm 47 forces gas stream G to flow parallel to first throttle plate 29 from the periphery of first throttle plate 29 toward the center of first throttle plate 29. When gas stream G reaches the center of first throttle plate 29, gas stream G flows through second arrangement of flow apertures 33 into central transfer chamber 27. Because the cumulative flow area of first arrangement of flow apertures 31 in first throttle plate 29 is preferably less than the flow area of annular portion 23b of inlet chamber 23, and because gas stream G is forced to flow parallel to first throttle plate 29 and make a 180° turn, there is a first pressure drop across first throttle plate 29 into first reduction chamber 41. The pressure drop from annular portion 23b to first reduction chamber 41 is dependent upon the flow rate of gas stream G and the position of first flexible diaphragm 47, and is caused by the acceleration of gas stream G through first arrangement of flow apertures 31. A second pressure drop occurs as gas stream G passes from first reduction chamber 41 through second arrangement of flow apertures 33 into central transfer chamber 27.

Gas stream G flows unabated across central transfer chamber 27 toward second throttle plate 35. Because loading pressure in second loading chamber 65 is vented simultaneously with loading pressure in first loading chamber 63, front surface 49a of second flexible diaphragm 49 lifts from the center of rear surface 35b of second throttle plate 35 in the same manner as first flexible diaphragm 47 lifted from first throttle plate 29. Thus, second arrangement of flow apertures 39 in second throttle plate 35 is opened before first arrangement of flow apertures 37 in second throttle plate 35. A third pressure drop occurs as gas stream G flows from central transfer chamber 27 into third reduction chamber 43 through second arrangement of flow apertures 39 in second throttle plate 35. Second flexible diaphragm 49 forces gas stream G to flow parallel to second throttle plate 35 from the center of second throttle plate 35 toward the periphery of second throttle plate 35.

At the periphery of second throttle plate 35, gas stream G flows out of third reduction chamber 43 into annular portion 25b of outlet chamber 25 through first arrangement of flow apertures 37 in second throttle plate 35. There is a fourth pressure drop across second throttle plate 35 as gas stream G flows from third reduction chamber 43 through first arrangement of flow apertures 37 into annular portion 25b. Gas stream G exits regulator 11 through outlet port 17 and flows into the downstream system. Pilot valve 104 will continue to open until the pressure in outlet chamber 25 increases back to the control pressure. When the flow through regulator 11 equals the inlet flow of gas stream G, a steady-state condition exists. Pilot valve 104 will maintain control valve 101 in the steady-state condition until the pressure conditions in outlet chamber 25 change.

On the other hand, if the load decreases from the steady-state condition, the sensed pressure in sensing chamber 106 increases, causing pilot valve 104 to close incrementally. As pilot valve 104 closes, the loading pressures in first loading chamber 63 and second loading chamber 65 increase. As the loading pressure in first loading chamber 63 increases, first flexible diaphragm 47 is forced against first throttle plate 29. First flexible diaphragm 47 closes from the periphery of first throttle plate 29 toward the center of first throttle plate 29, thereby closing first arrangement of flow apertures 31 in first throttle plate 29 before second arrangement of flow apertures 33 in first throttle plate 29. Simultaneously, second flexible diaphragm 49 closes from the periphery of second throttle plate 35 toward the center of second throttle plate 35, thereby closing first arrangement of flow apertures 37 in second throttle plate 35 before second arrangement of flow apertures 39 in second throttle plate 35. If the load decreases to the no-flow condition, pressure in sensing chamber 106 causes pilot valve 104 to completely close due to the action of pilot spring 107 on control diaphragm 106*b*. As stated above, when pilot valve 104 is completely closed, full inlet pressure is exerted upon first flexible diaphragm 47 and second flexible diaphragm 49, thereby closing regulator 11.

Control system 100 is considered passive because pilot valve 104 has no control over either first flexible diaphragm 47 or second flexible diaphragm 49, but controls the loading pressure in both first loading chamber 63 and second loading chamber 65 equally, such that the combined pressure drop across first throttle plate 29 and second throttle plate 35 is communicated to control valve 101 and compared to the selected control pressure. Common applications for regulator 11 having such a single pilot-valve control system 100, include regulator stations, high-capacity industrial meter sets, and relief valve operation. For relief operation, pilot valve 104 and valve portion 104*a* are installed as shown in FIG. 6A, such that regulator 11 closes as set point, or control pressure, is reached; and regulator 11 opens as set point, or control pressure, is exceeded.

Figure 7:
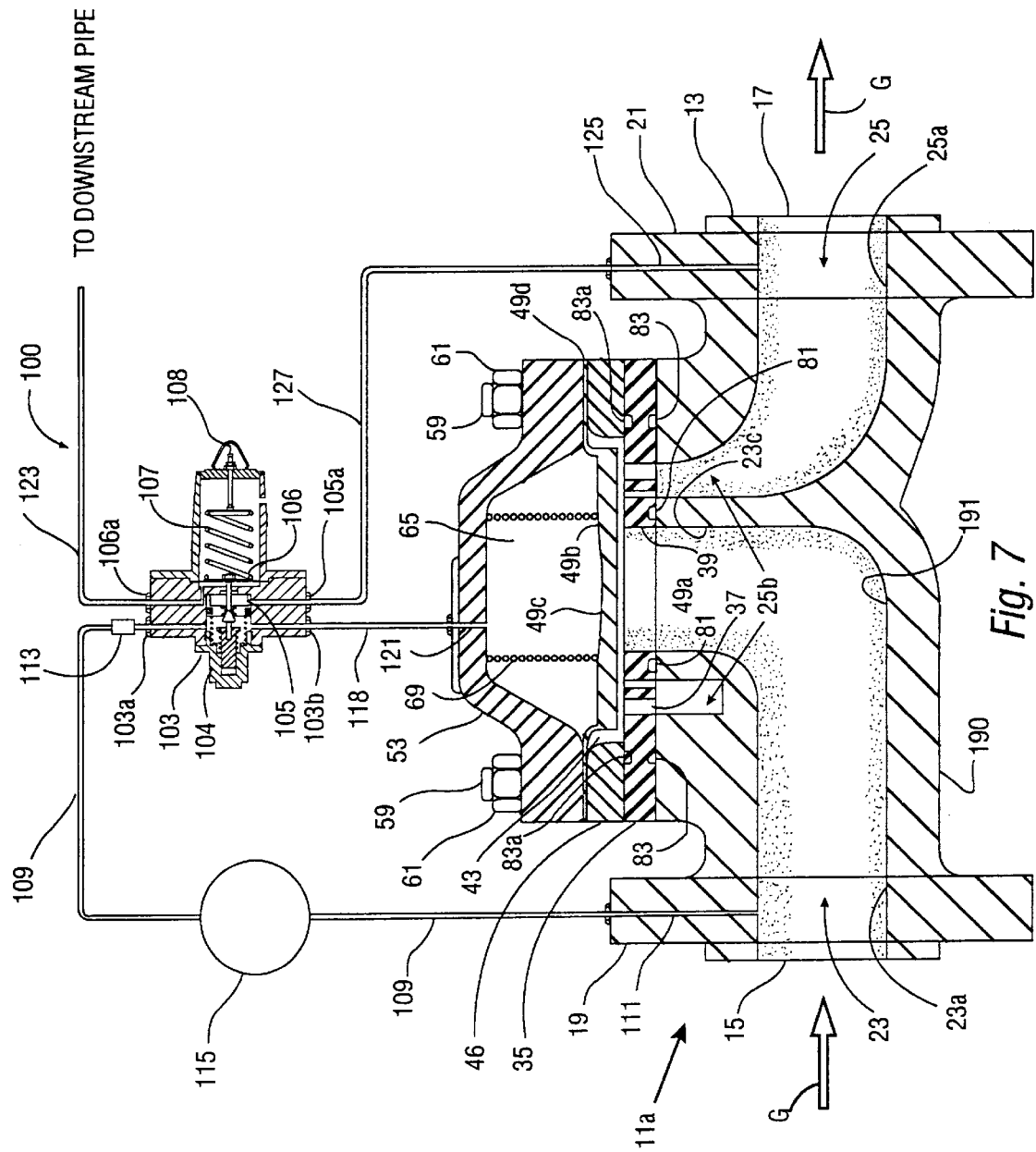
FIG. 7 is a cross-sectional view of the gas-flow regulator of FIG. 1 having only a single port.

Referring now to FIG. 7 in the drawings, a single-port regulator 11*a* according to the present invention is illustrated. Regulator 11*a* is a single-port version of regulator 11 illustrated in FIG. 4. In regulator 11*a*, only one throttle plate, one flexible diaphragm, one loading chamber, and one closed-loop control system are required. Thus, only second throttle plate 35, second flexible diaphragm 49, and second loading chamber 65 are necessary. First throttle plate 29 has been replaced by a solid regulator wall 190. Regulator wall 190 includes internal contours 191 that aid in defining inlet chamber 23, longitudinal cylindrical portion 23*a*, and transverse central cylindrical portion 23*c*. Components of regulator 11*a* having reference numerals in common with components of regulator 11 of FIG. 4 should be considered to be the same in form and function as their counterparts in regulator 11. It should be understood that regulator 11*a* will function identically if second throttle plate 35, second flexible diaphragm 49, and second loading chamber 65 were replaced by first throttle plate 29, first flexible diaphragm 47, and first loading chamber 63 of regulator 11. In regulator 11*a*, inlet chamber 23 is modified such that annular portion 23*b* is replaced by a central cylindrical portion 23*c* that turns upward 90° from cylindrical portion 23*a* such that gas stream G flows through second arrangement of flow apertures 39 in second throttle plate 35. Annular portion 25*b* of outlet chamber 25 completely circumscribes central cylindrical portion 23*c*, just as annular portion 25*b* circumscribed central transfer chamber 27 of regulator 11.

Regulator 11*a* functions in a very similar fashion as the second stage of regulator 11. Single-port regulator 11*a* allows for two separate pressure drops, in series. A first pressure drop occurs as gas stream G flows through second arrangement of flow apertures 39 of second throttle plate 35 into third reduction chamber 43. A second pressure drop occurs, in series with the first pressure drop, as gas stream G flows through first arrangement of flow apertures 37 of second throttle plate 35 into annular portion 25*b* of outlet chamber 25. Control of regulator 11*a* and the two pressure drops is performed by closed-loop control system 100, as described above with respect to regulator 11. The configuration of regulator 11*a* is designed to substantially reduce operational noise of regulator 11*a* by minimizing unstable turbulent flow within the valve body.

Figure 8:
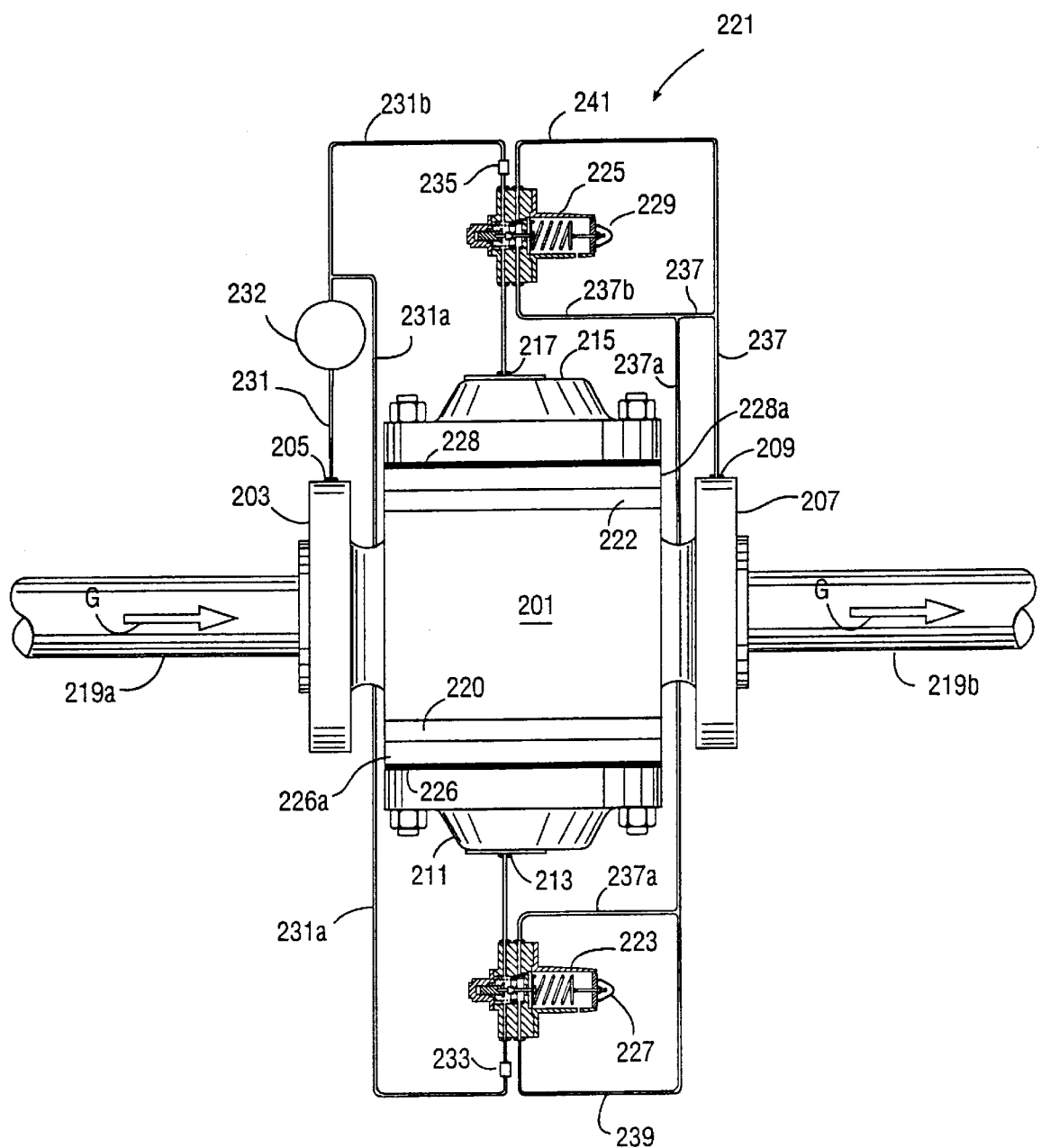
FIG. 8 is a plan view of the gas-flow regulator of FIG. 1 with a closed-loop control system having two control valves, in which the control system is active.

Referring now to FIG. 8 in the drawings, a two-port regulator 201, identical in all respects to regulator 11, is illustrated in a plan view. Regulator 201 includes an inlet flange 203 with an inlet flange tap 205, and an outlet flange 207 with an outlet flange tap 209. Regulator 201 also includes a first diaphragm casing 211 with a first diaphragm casing tap 213, and a second diaphragm casing 215 with a second diaphragm casing tap 217. As with regulator 11, regulator 201 is adapted to be installed in a conventional gas pipeline having an upstream portion 219*a* and a downstream portion 219*b* to regulate a gas stream G. Regulator 201 includes a first throttle plate 220 and a second throttle plate 222. First throttle plate 220 is preferably identical in form and function to first throttle plate 29 of regulator 11. Likewise, second throttle plate 222 is preferably identical in form and function to second throttle plate 35 of regulator 11. In addition, regulator 201 includes a first spacer ring 226*a* and a second spacer ring 228*a*. First spacer ring 226*a* and second spacer ring 228*a* are preferably identical in form and function to first spacer ring 45 and second spacer ring 46, respectively, of regulator 11.

Regulator 201 is controlled by a closed-loop control system 221, similar to control system 100 of regulator 11 of FIG. 4. Control system 221 includes a first control valve 223 and a second control valve 225. First control valve 223 and second control valve 225 are preferably pilot valves identical to control valve 101. However, control system 221 is configured such that first control valve 223 controls the loading pressure in a first loading chamber (not shown, but located within first diaphragm casing 211) and movement of a first flexible diaphragm 226. First flexible diaphragm 226 of regulator 201 is preferably identical in form and function to first flexible diaphragm 47 of regulator 11. Control system 221 is further configured such that second control valve 225 independently controls the loading pressure in a second loading chamber (not shown, but located within second diaphragm casing 215) and movement of a second flexible diaphragm 228. Second flexible diaphragm 228 of regulator 201 is preferably identical in form and function to second flexible diaphragm 49 of regulator 11.

First control valve 223 includes a first control pressure adjustment member 227, whereby a first selected control pressure may be set within first control valve 223. Likewise, second control valve 225 includes a second control pressure adjustment member 229, whereby a second selected control pressure may be set within second control valve 225. An input conduit 231 places an inlet chamber (not shown, but identical to inlet chamber 23) of regulator 201 into fluid communication with supply chambers (neither shown, but both are identical to supply chamber 103 in FIG. 5) in both first control valve 223 and second control valve 224. An optional filter member 232 prevents solids and other debris carried in gas stream G from fouling either first control valve 223 or second control valve 225. Input conduit 231 splits into a first input conduit 231*a* in fluid communication with first control valve 223, and a second input conduit 231*b* in fluid communication with second control valve 225.

A first restrictor member 233 is disposed in first input conduit 231*a* to selectively restrict the flow of gas to first control valve 223, and allows for a variable pressure drop to be achieved in the supply chamber of first control valve 223. In an identical fashion, a second restrictor member 235 is disposed in second input conduit 231*b* to selectively restrict the flow of gas to second control valve 225, and allows for a variable pressure drop to be achieved in the supply chamber of second control valve 225. First restrictor member 233 and second restrictor member 235 are preferably identical in form and function to restrictor member 113.

A vent line 237 is formed by the union of a first vent line 237*a* from first control valve 223, and a second vent line 237*b* from second control valve 225. Vent line 237 is in fluid communication with the outlet chamber of regulator 201 via outlet flange tap 209. A first sense line 239 is in fluid communication with first control valve 223 and vent line 237 so that the outlet pressure in the outlet chamber of regulator 201 may be communicated to a sensing chamber within first control valve 223. In a similar manner, a second sense line 241 is in fluid communication with second control valve 225 and vent line 237 so that the outlet pressure in the outlet chamber of regulator 201 may be communicated to a sensing chamber within second control valve 225.

As with regulator 11, regulator 201 performs four separate pressure drops in series. By utilizing a separate control valve for each loading chamber of regulator 201, a first series of pressure drops across first throttle plate 220, and a separate and distinct second series of pressure drops across second throttle plate 222, may be maintained. Because first control valve 225 functions separately and independently from second control valve 227, failure in one of the control valves does not effect the operation of the other control valve, and control system 221 is considered active. When control system 221 is configured in this manner, a single regulator 201 provides both the working component and the monitoring component in the conventional working/monitoring configuration. It is preferred that first throttle plate 220, first flexible diaphragm 226, first control valve 223, and the first loading chamber serve as a working component; and that second throttle plate 222, second flexible diaphragm 228, second control valve 229, and the second loading chamber serve as the monitoring component, because such a configuration places the working component, which is more likely to malfunction due to debris in gas stream G, upstream of the monitoring component. Although the reverse control scheme will also function acceptably.

In this configuration, the control pressure set by second control pressure adjustment member 229 of second control valve 225 is set incrementally higher than the control pressure of first control valve 223. This will cause the monitoring component to run wide open as long as the working component is functioning properly. If the working component fails to close properly, the downstream pressure will begin to rise. If the downstream pressure rises to the selected control pressure of the monitoring component, the monitoring component will begin to throttle gas stream G and take over control of the outlet pressure at in the outlet chamber of regulator 201.

Figure 9:
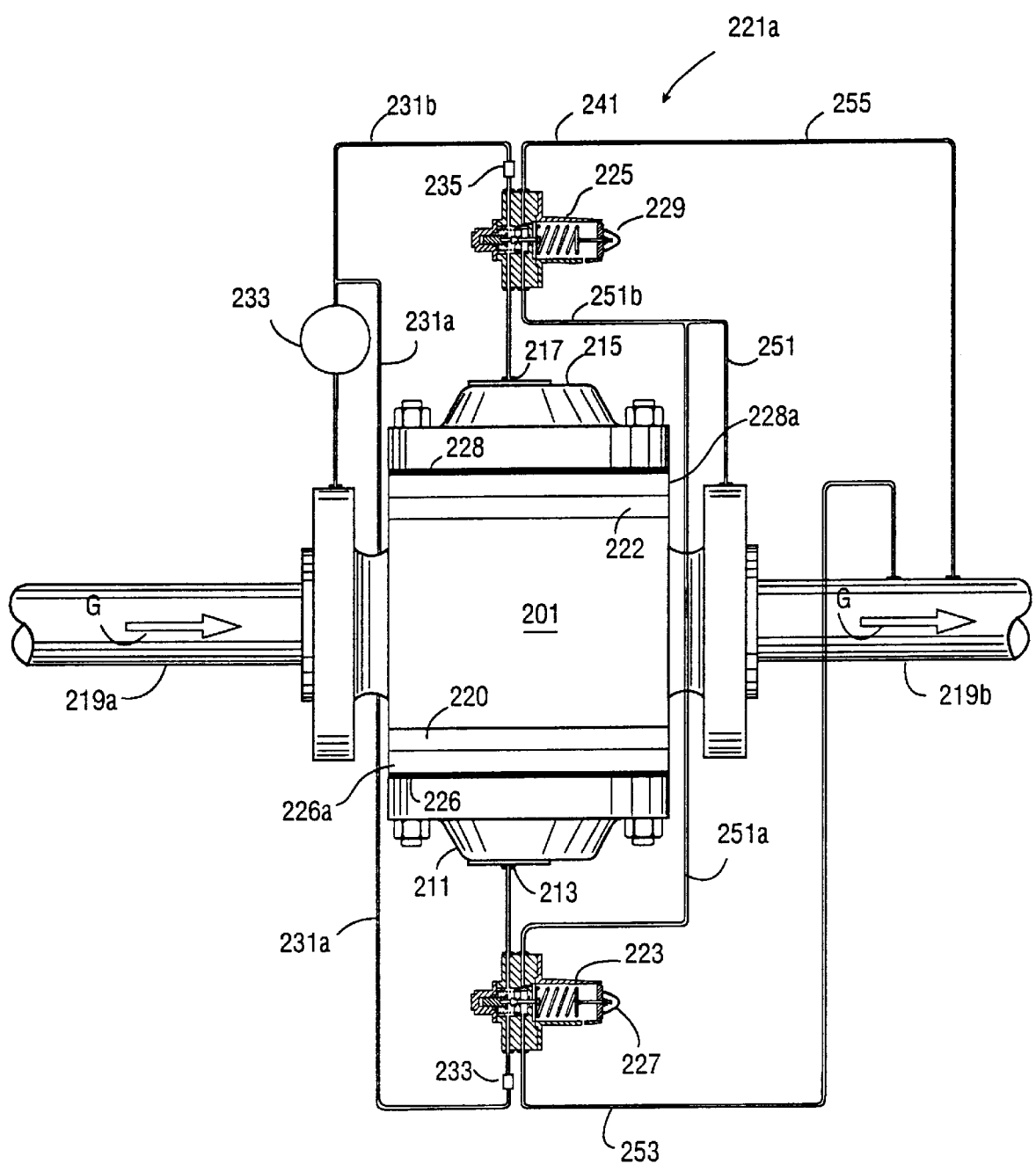
FIG. 9 is a plan view of the gas-flow regulator of FIG. 1 with a closed-loop control system having two control valves, similar to the control system of FIG. 8.

Referring now to FIG. 9 in the drawings, regulator 201 is illustrated having a control system 221a that is slightly modified over control system 221 of FIG. 8. Vent line 237 has been replaced by vent line 251. First vent line 237a and second vent line 237b of FIG. 8 have been replaced by a first vent line 251a and a second vent line 251b that place first control valve 223 and second control valve 225, respectively, into fluid communication with the outlet chamber of regulator 201. In addition, first sense line 239 has been replaced with a first sense line 253, such that the pressure in downstream portion 219b of gas pipeline may be communicated directly to first control valve 223. Also, second sense line 241 has been replaced with a second sense line 255, such that the pressure downstream of first sense line 253 may be communicated directly to second control valve 225, independently of first control valve 223. It should be apparent that first sense line 253 and second sense line 255 may be located at a variety of locations within the pipeline and control system, including various locations within regulator 201 itself, as will be explained below. By locating first sense line 253 and second sense line 255 at various locations within the pipeline system, the operation of regulator 201 may be relative to a variety of pressure conditions within the pipeline system.

Figure 10:
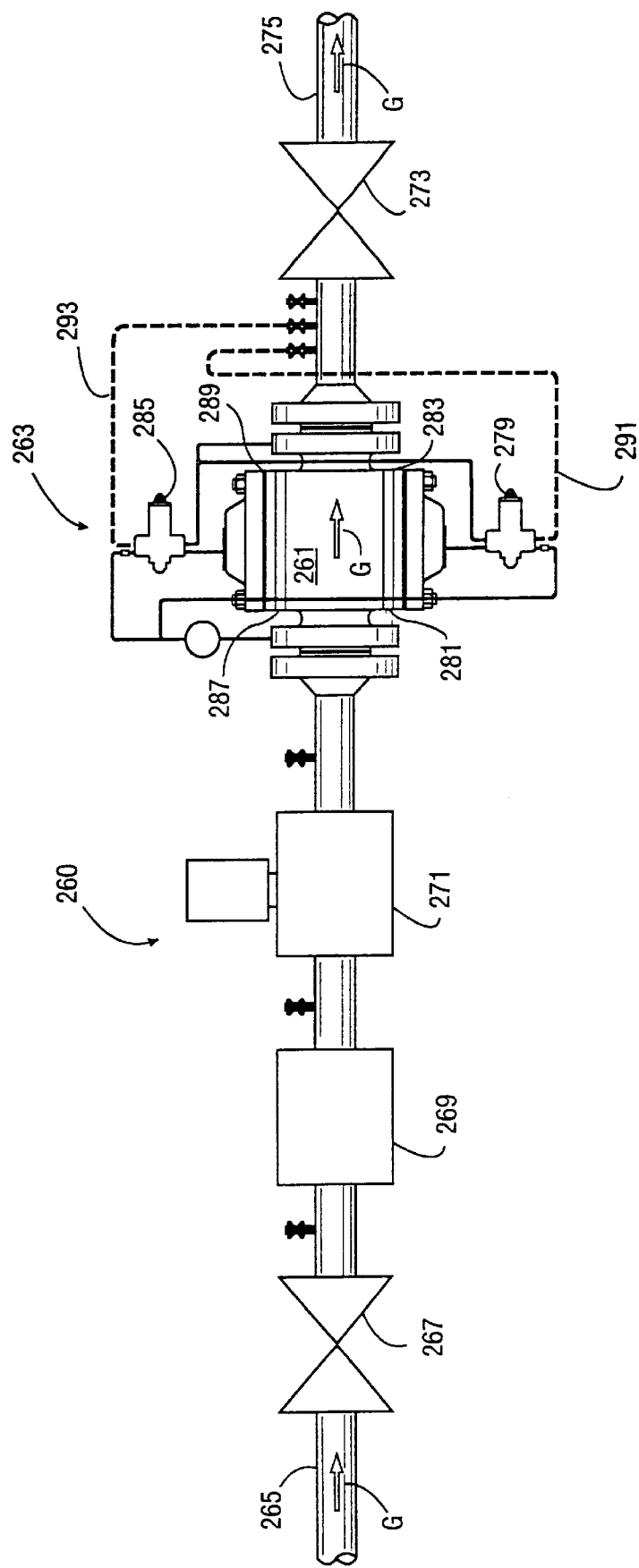
FIG. 10 is a schematic illustrating the gas-flow regulator and control system of FIG. 9 used in a high-capacity meter-station application.

Referring now to FIG. 10 in the drawings, a large-capacity meter-station application is illustrated. In an assembly 260, a single, dual-pilot regulator 261 and a control system 263, are configured identically to regulator 201 and control system 221 of FIG. 9. As long as local code requirements do not specifically require two regulators, using a single regulator to provide both the working component and the monitoring component saves installation space and minimizes the necessary hardware, such as flanges, pipe, taps, and gaskets, associated with construction of the station. In assembly 260, a distribution pressure inlet 265 receives a gas stream G at a distribution pressure set by the gas company. Distribution pressure inlet 265 is connected to a first conventional shut-off valve 267. A conventional filter 269, preferably a 30-mesh strainer, is installed to ensure that undesirable solids, free liquids, and other debris do not foul assembly 260. Next, a high-capacity line meter 271 for measuring the flow of gas stream G is installed in assembly 260. Then, a gas-flow regulator 261 and a control system 263 is installed. Regulator 261 and control system 263 are identical to the regulator 201 and control system 221 of FIG. 9. Downstream of regulator 261 is a second conventional shut-off valve 273 and a fuel line pressure outlet 275.

Assembly 260 is a conventional working/monitoring configuration, in which regulator 261 and control system 263 constitute both a working component and a monitoring component. The working component generally includes first control valve 279, a first throttle plate 281, a first flexible diaphragm 283, and a first loading chamber (not shown). The monitoring component generally includes second control valve 285, a second throttle plate 287, a second flexible diaphragm 289, and a second loading chamber (not shown). As is shown, a first sense line 291 to first control valve 279 of control system 263 is tapped into assembly 260 downstream of regulator 261, but upstream of second shut-off valve 273. A second sense line 293 to second control valve 285 of control system 263 is tapped into assembly 260 downstream of regulator 261 and upstream of second shut-off valve 273, but downstream of first sense line 291. The selected control pressure of second control valve 285 is set incrementally higher than the selected control pressure of first control valve 279. For this reason, the monitoring component will run wide open unless the working component fails to function properly. If the working component fails to close properly, the downstream pressure will begin to rise. If the downstream pressure rises to the selected control pressure of second control valve 285, second control valve 285 will begin to throttle gas stream G and take over control of the pressure at fuel line pressure outlet 275.

Assembly 260 may be used in stations that normally use a high-pressure shut-off type regulators for protection against line over-pressurization. By utilizing regulator 261 and control system 263, assembly 260 is not shut down due to a failure in the working component; rather, assembly 260 merely operates at a slightly higher pressure until the problem can be fixed, maintaining service to customers in the event of primary regulator failure. It should be understood that meter 271 may be located downstream of second sense line 293 if fixed-factor measurement is preferred.

Figure 11:
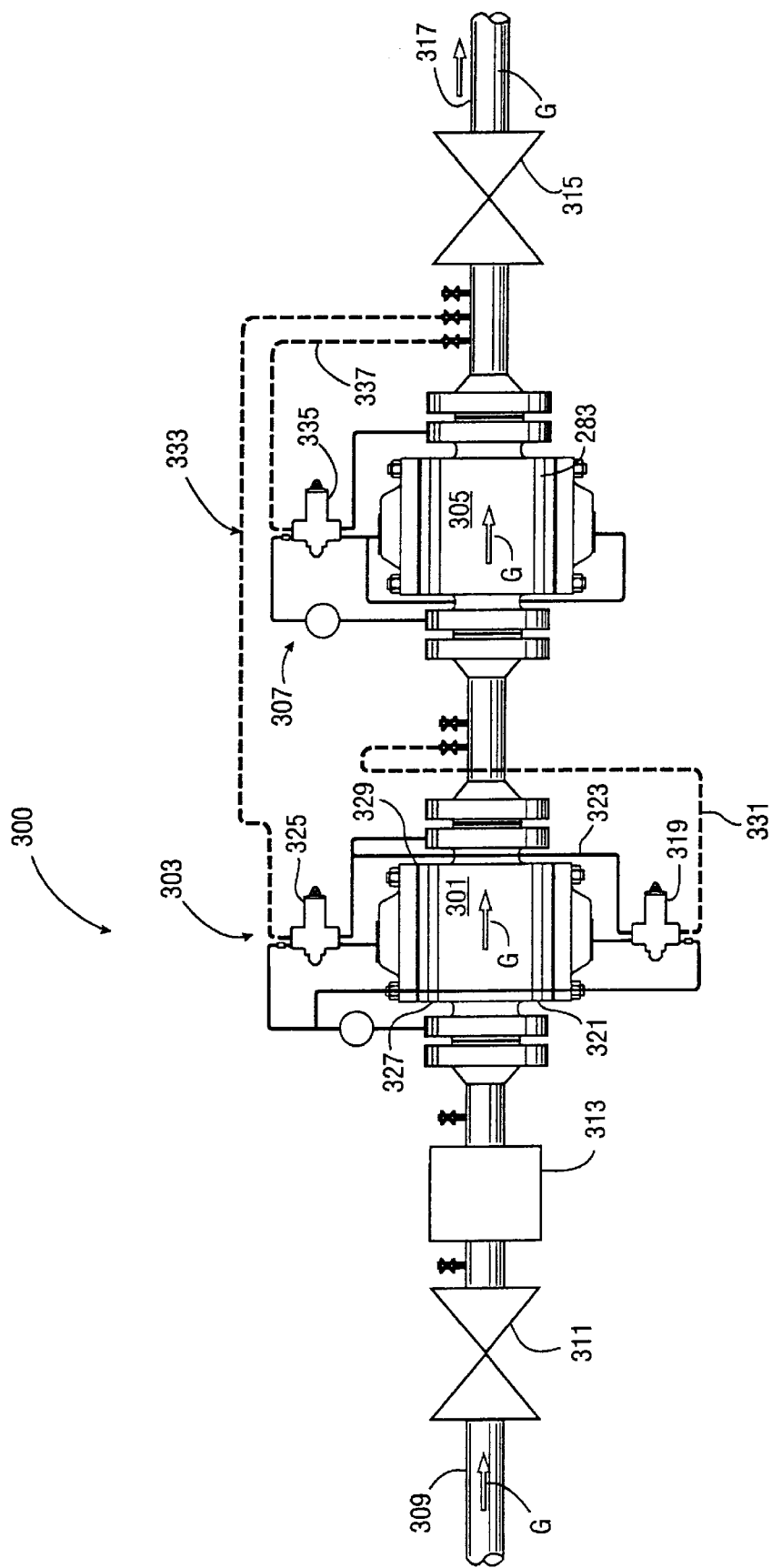
FIG. 11 is a schematic illustrating the gas-flow regulator and control system of FIG. 8 connected in series with the gas-flow regulator and control system of FIG. 4 in a two-stage distribution regulator-station application.

Referring now to FIG. 11 in the drawings, a distribution regulator-station, or city-gate application is illustrated. In an assembly 300 of FIG. 11, a dual-pilot first regulator 301 and first control system 303, configured identically to regulator 201 and control system 221 of FIG. 9, connected in series with a single-pilot second regulator 305 and a second control system 307 can perform a relatively large pressure reduction in two stages. In assembly 300, a high pressure inlet 309 represents the high pressure transmission gas line coming off of the main gas line (not shown). High pressure inlet 309 is connected to a conventional shut-off valve 311. A conventional filter 313, preferably a 30-mesh strainer, is installed to ensure that undesirable solids, free liquids, and other debris do not foul assembly 300. Then, first regulator 301 and first control system 303 are connected in series with second regulator 305 and second control system 307. Downstream of first regulator 301 and second regulator 305 is a second conventional shutoff valve 315 and a distribution pressure outlet 317.

Assembly 300 is a combination of a conventional working/monitoring two-pilot configuration, and a single pilot working regulator configuration. First regulator 301 and first control system 303 constitute both a first working component and a monitoring component. The first working component generally includes a first control valve 319, a first throttle plate 321, a first flexible diaphragm 323, and a first loading chamber (not shown). The monitoring component generally includes a second control valve 325, a second throttle plate 327, a second flexible diaphragm 329, and a second loading chamber (not shown). As is shown, a first sense line 331 to first control valve 319 of first control system 303 is tapped into assembly 300 downstream of first regulator 301, but upstream of second regulator 305. A second sense line 333 to second control valve 325 of control system 303 is tapped into assembly 300 downstream of second regulator 305, but upstream of second shut-off valve 315. The second working component is provided by second regulator 305 and second control system 307. Second regulator 305 and second control system 307 are similar to the regulator and control system of FIG. 4. Second control system 307 includes a control valve 335 having a sense line 337. Sense line 337 is tapped into assembly 300 downstream of second regulator 305, but upstream of second sense line 333 of second control valve 325 of first control system 303.

In this configuration, a first-stage pressure reduction is performed by the first working component, and a second-stage pressure reduction is performed in two stages by the second working component, second regulator 305 and second control system 307. The selected control pressure of the monitoring component is set incrementally higher than the selected control pressure of the second working component. For this reason, the monitoring component will run wide open unless the second working component 305 fails to function properly. If the second working component fails to close properly, the downstream pressure will begin to rise. If the downstream pressure rises to the selected control pressure of the monitoring component 303, the monitoring component will begin to throttle gas stream G and take over control of the pressure at fuel line pressure outlet 317. Because second sense line 333 of second control valve 325 is located downstream of sense line 337 of control valve 335, the monitoring component provided by first regulator 301 protects against failure of second regulator 305 or second control system 307.

This type of two-stage pressure reduction is particularly helpful in situations where a large pressure reductions are required. If such a large pressure reduction were taken across a single regulator, freezing of the regulator or the control valve might occur due to the Joule-Thompson cooling effect caused by the physics of reduction in gas pressure. By performing the large pressure reduction in a first and second stage over two separate regulators, the chances of freezing are minimized, and the expense and maintenance of anti-icing devices may be eliminated. In addition, by staging the large pressure reduction across two separate regulators, and using regulators that require gas stream G to flow four times through two separate throttle plates, the operational noise in the station is greatly reduced.

Figure 12:
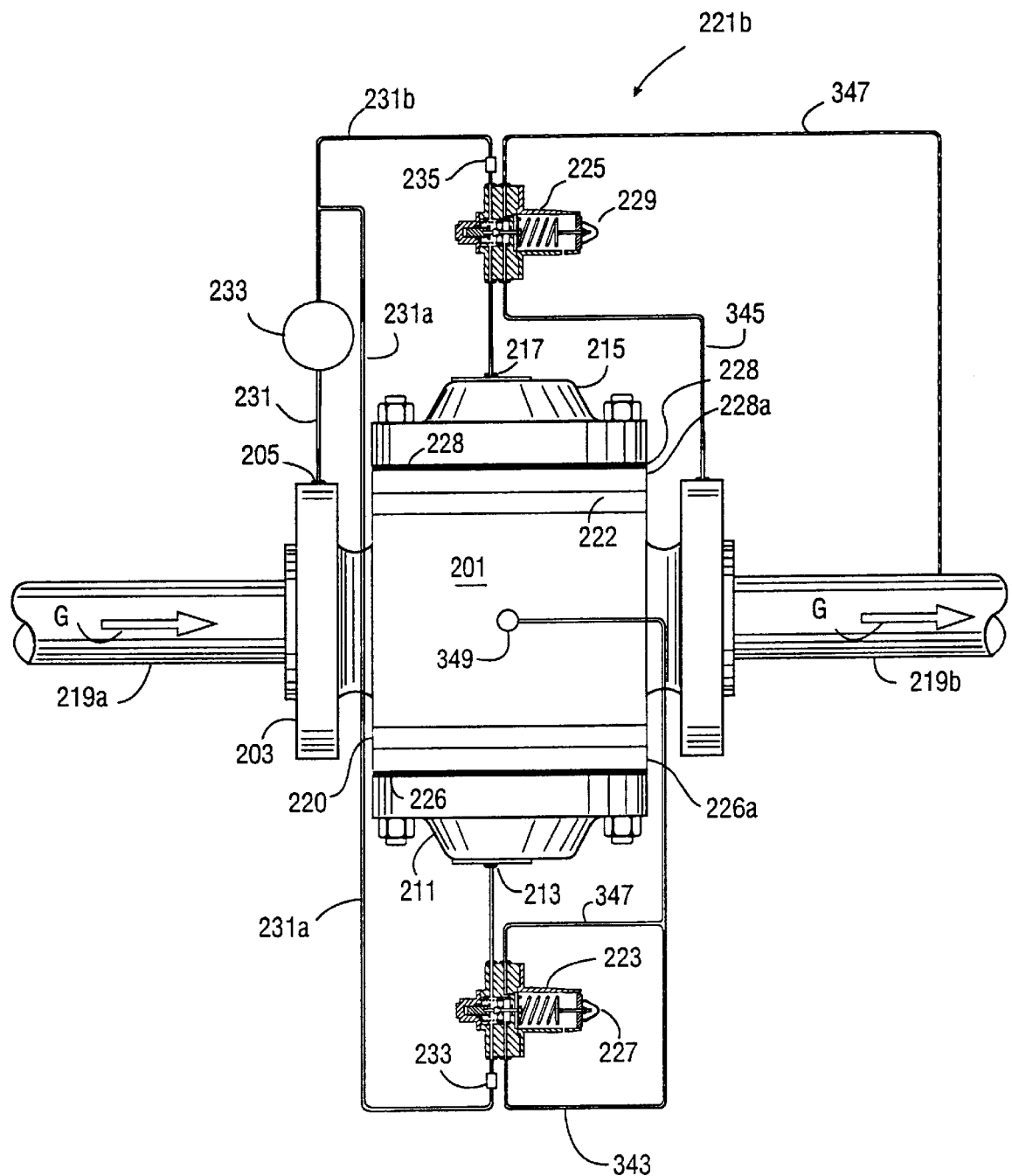
FIG. 12 is a plan view of the gas-flow regulator of FIG. 1 with a closed-loop control system with two control valves, in which one of the control valves is tapped into the central transfer chamber of the regulator.

Referring now to FIG. 12 in the drawings, regulator 201 is illustrated having a control system 221b that is slightly modified over control system 221 of FIG. 8. Vent line 237a and sense line 239 of FIG. 8 have been replaced by vent line 341 and sense line 343, respectively. Also, second vent line 237b and second sense line 241 of FIG. 8 have been replaced with a second vent line 345 and a second sense line 347, respectively. Thus, the pressure in downstream portion 219b of gas pipeline may be directly communicated to second control valve 225, independent of first control valve 223. As explained above, first vent line 341 and first sense line 343 may be located at a variety of locations within the pipeline and control system, including within regulator 201 itself. As is shown, first vent line 341 and first sense line 343 are joined together and tapped into the central transfer chamber (see FIG. 1) of regulator 201 via a central transfer chamber tap 349.

This configuration of control system 221 allows regulator 201 to perform in a working/working capacity as opposed to the conventional working/monitoring arrangement. A first working component includes first control valve 223, first throttle plate 220, first flexible diaphragm 226, and first loading chamber (not shown). A second working component includes second control valve 225, second throttle plate 222, second flexible diaphragm 228, and second loading chamber (not shown).

In this configuration, because second control valve 225, second throttle plate 222, second flexible diaphragm 228, and second loading chamber constitute an independent second working component, as opposed to a monitoring component, the control pressure set by second control pressure adjustment member 229 of second control valve 225 is set lower than the control pressure of first control valve 223. By providing central transfer chamber tap 349, regulator 201 of FIG. 12 can be used in a high-differential pressure reduction application to ensure that the pressure reduction is evenly distributed across the first working component and the second working component in a controlled two-stage pressure drop performed within a single regulator body. The pressure in the central transfer chamber is controlled with control valve 223 that is in fluid communication with the central transfer chamber via sense line 341.

Figure 13:
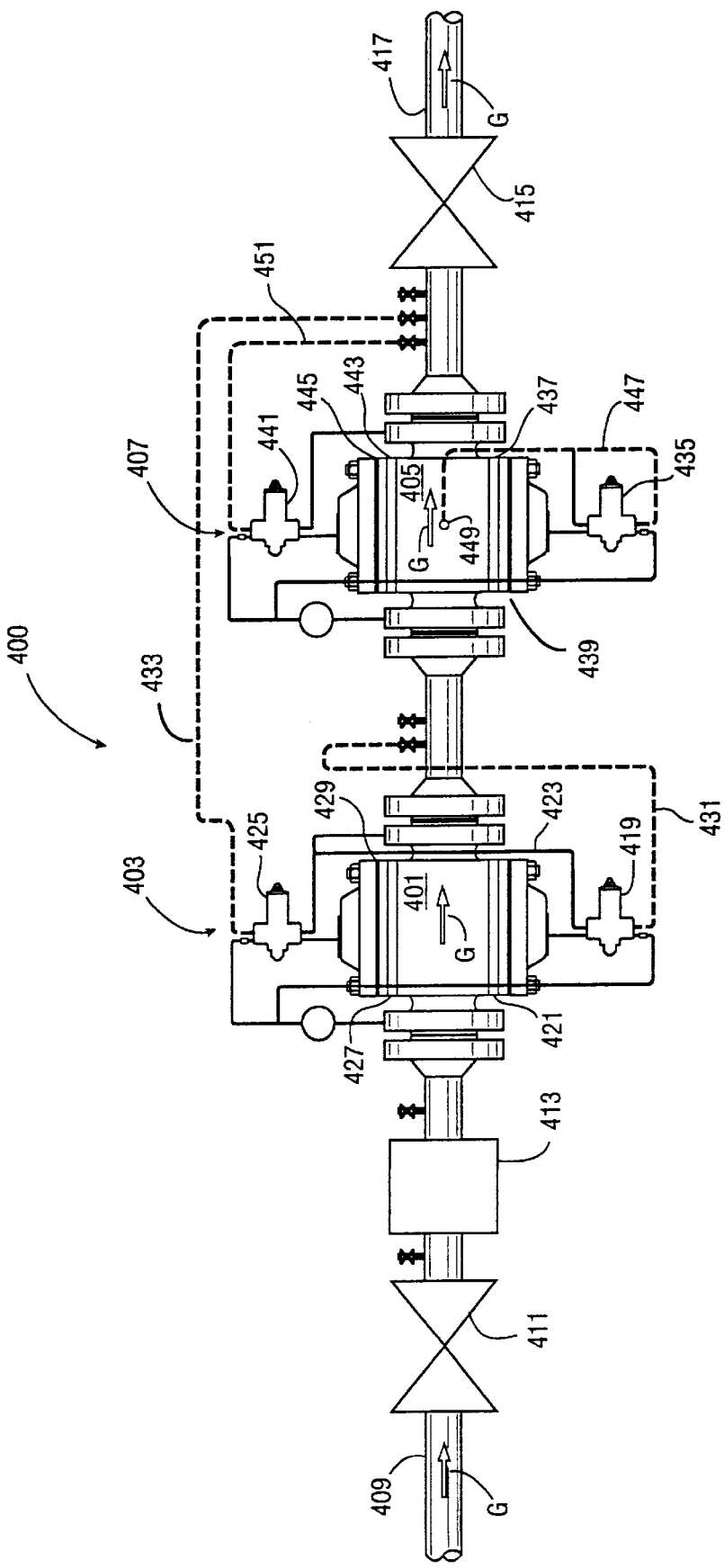
FIG. 13 is a schematic illustrating a gas-flow regulator and control system of FIG. 9 connected in series with a gas-flow regulator and control system of FIG. 12 used in a high-differential regulator station application.

Referring now to FIG. 13 in the drawings, a distribution regulator-station, or city-gate application, similar to the city-gate application of FIG. 11, is illustrated. In assembly 300 of FIG. 11, a dual-pilot first regulator 301 and first control system 303 was connected in series with a single-pilot second regulator 305 and a second control system 307 to perform a relatively large pressure reduction in three stages. However, in an assembly 400 of FIG. 13, a dual-pilot first regulator 401 having a first control system 403 is connected in series with a dual-pilot second regulator 405 having a second control system 407. First regulator 401 and first control system 403 are similar to regulator 201 and control system 221a of FIG. 9. However, second regulator 405 and second control system 407 are similar to regulator 201 and control system 221b of FIG. 12, in which first vent line 341 and first sense line 343 were interconnected and tapped into the central transfer chamber of regulator 201. The configuration of FIG. 13 is particularly well suited for applications involving extreme pressure differentials in which it is desirable to perform the extreme pressure reduction in three controlled separate stages.

In assembly 400 of FIG. 13, a high-pressure inlet 409 represents the transmission gas line coming off of the main gas line (not shown). High-pressure inlet 409 receives a gas stream G and is connected to a conventional shut-off valve 411. A conventional filter 413, preferably a 30-mesh strainer, is installed to ensure that undesirable solids, free liquids, and other debris do not foul assembly 400. Then, first regulator 401 and first control system 403 are connected in series with second regulator 405 and control system 407. Downstream of first regulator 401 and second regulator 405 is a second conventional shut-off valve 415 and a distribution pressure outlet 417.

Assembly 400 is a combination of a conventional working/monitoring configuration, in which first regulator 401 and first control system 403 constitute both a first working component and a monitoring component; and a working/working configuration in which second regulator 405 and second control system 407 constitute a second working component and a third working component. The first working component generally includes a first control valve 419, a first throttle plate 421, a first flexible diaphragm 423, and a first loading chamber (not shown). The monitoring component generally includes a second control valve 425, a second throttle plate 427, a second flexible diaphragm 429, and a second loading chamber (not shown). As is shown, a first sense line 431 to first control valve 419 of first control system 403 is tapped into assembly 400 downstream of first regulator 401, but upstream of second regulator 405. A second sense line 433 to second control valve 425 of control system 403 is tapped into assembly 400 downstream of second regulator 405, but upstream of second shut-off valve 415. The second working component and the third working component are provided by second regulator 405. The second working component generally includes a first control valve 435, a first throttle plate 437, a first flexible diaphragm 439, and a first loading chamber (not shown). The third working component generally includes a second control valve 441, a second throttle plate 443, a second flexible diaphragm 445, and a second loading chamber (not shown).

Second control system 407 of regulator 405 includes a first sense line 447 in fluid communication with first control valve 435. First sense line 447 is tapped into the central transfer chamber (not shown) of regulator 405 via a central transfer chamber tap 449, thereby placing first control valve 435 into fluid communication with the central transfer chamber of regulator 405. Second control system 407 of regulator 405 includes a second sense line 451 in fluid communication with second control valve 441. Second sense line 451 is tapped into assembly 400 downstream of regulator 405. In this configuration, a first-stage pressure reduction is performed by the working component of first regulator 401, a second-stage pressure reduction is performed by the first working component of second regulator 405, and a third-stage pressure reduction is performed by the second working component of second regulator 405.

It is preferred that the selected control pressure of the monitoring component be set incrementally higher than the selected control pressure of second control valve 441. By setting the control valves in this manner, the monitoring component will run wide open unless second control valve 441 fails to function properly. If the downstream pressure rises to the selected control pressure of the monitoring component 403, the monitoring component will begin to throttle gas stream G and take over control of the pressure at fuel line pressure outlet 417. Because second sense line 433 of second control valve 425 is located downstream of second sense line 451 of second control valve 441, the monitoring component of first regulator 401 protects against failure of second regulator 405 or second control system 407.

In this configuration, it is preferred that the control pressures of first working component, second working component, and third working component all be set to a value, such that the respective pressure drops are evenly distributed. This type of three-stage pressure reduction is particularly helpful in situations where an extremely large pressure reduction is required. If such an extreme pressure reduction were taken across a single regulator, freezing of the regulator or the control valve might occur due to the Joule-Thompson cooling effect caused by the physics of reduction in gas pressure. By performing the extremely large pressure reduction over three separate stages and two separate regulators, the chances of freezing are minimized, and the expense and maintenance of anti-icing devices may be eliminated. In addition, by staging the extreme pressure reduction across two separate regulators, and using regulators that require gas stream G to flow four times through two throttle plates, the operational noise in the station is greatly reduced.

Figure 14:
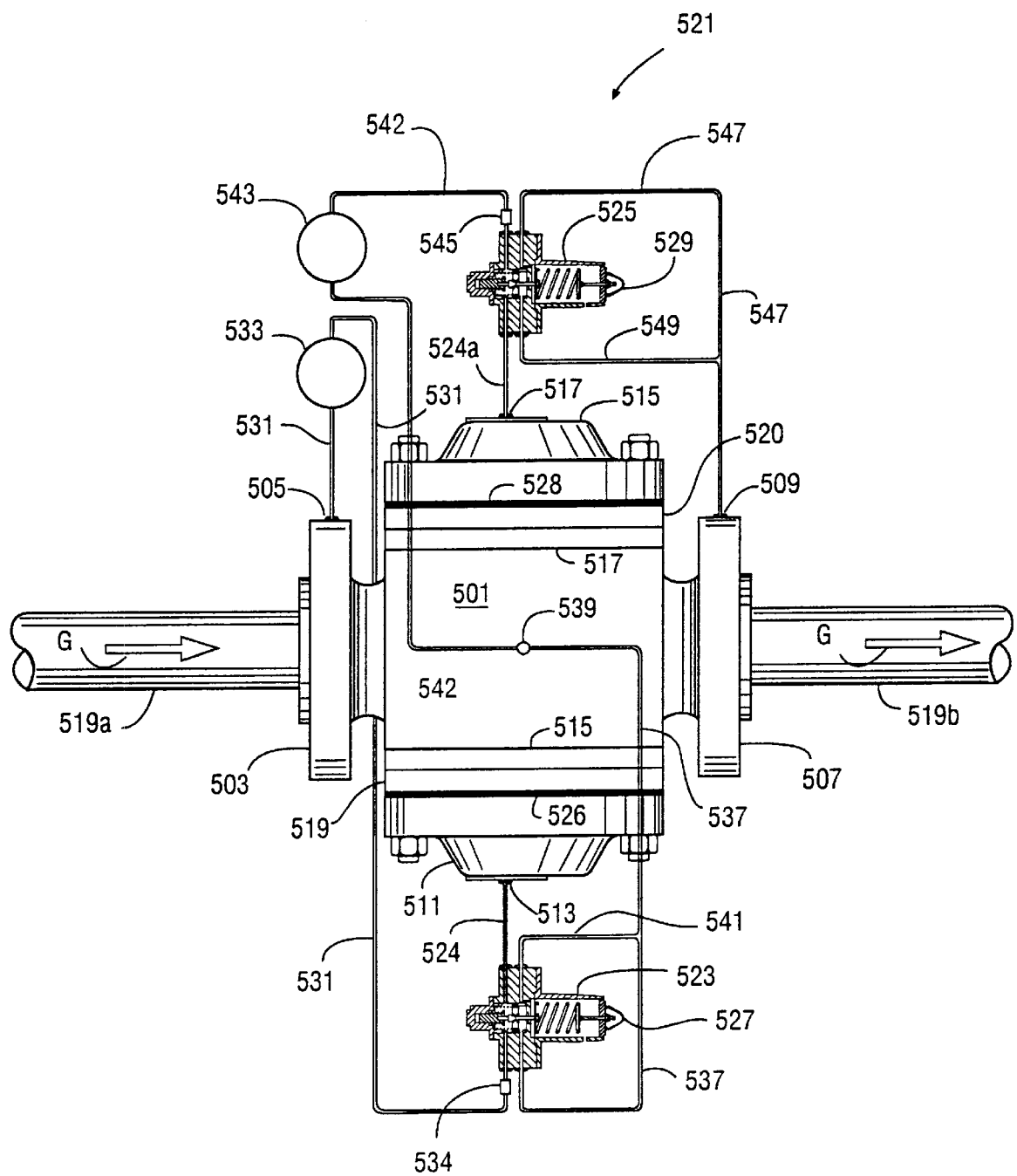
FIG. 14 is a plan view of the gas-flow regulator of FIG. 1 with a closed-loop control system with two control valves, similar to the control system of FIG. 12.

Referring now to FIG. 14 in the drawings, a gas-flow regulator 501, identical in all respects to regulator 11 of FIG. 1, is illustrated in a plan view. Regulator 501 includes an inlet flange 503 with an inlet flange tap 505, and an outlet flange 507 with an outlet flange tap 509. Regulator 501 also includes a first diaphragm casing 511 with a first diaphragm casing tap 513, and a second diaphragm casing 515 with a second diaphragm casing tap 517. As with regulator 11, regulator 501 is adapted to be installed in a conventional gas pipeline having an upstream portion 519a and a downstream portion 519b to regulate a gas stream G. Regulator 501 includes a first throttle plate 515 and a second throttle plate 517. First throttle plate 515 is preferably identical in form and function to first throttle plate 29 of regulator 11. Likewise, second throttle plate 517 is preferably identical in form and function to second throttle plate 35 of regulator 11. In addition, regulator 501 includes a first spacer ring 519 and a second spacer ring 520. First spacer ring 519 and second spacer ring 520 are preferably identical in form and function to first spacer ring 45 and second spacer ring 46, respectively, of regulator 11.

Regulator 501 is a dual-pilot regulator controlled by a closed-loop control system 521, similar to control system 100 of regulator 11 (see FIG. 4). Control system 521 includes a first control valve 523 and a second control valve 525. First control valve 523 and second control valve 525 are preferably identical to control valve 101 of control system 100. However, control system 521 is configured such that first control valve 523 controls the loading pressure in a first loading chamber (not shown, but located within first diaphragm casing 511) and movement of a first flexible diaphragm 526. First flexible diaphragm 526 of regulator 501 is preferably identical in form and function to first flexible diaphragm 47 of regulator 11. First control valve 523 is in fluid communication with the first loading chamber via a first supply conduit 524 and first diaphragm casing tap 513. Control system 521 is further configured such that second control valve 525 independently controls the loading pressure in a second loading chamber (not shown, but located within second diaphragm casing 515) and movement of a second flexible diaphragm 528. Second flexible diaphragm 528 of regulator 501 is preferably identical in form and function to second flexible diaphragm 49 of regulator 11. Second control valve 525 is in fluid communication with the second loading chamber via a second supply conduit 524a and second diaphragm casing tap 517.

First control valve 523 includes a first control pressure adjustment member 527, whereby a first selected control pressure may be set within first control valve 523. Likewise, second control valve 525 includes a second control pressure adjustment member 529, whereby a second selected control pressure may be set within second control valve 525. A first inlet conduit 531 places an inlet chamber (not shown, but identical to inlet chamber 23 of regulator 11) into fluid communication with a supply chamber (identical to supply chamber 103 of control valve 101 of FIG. 5) in first control valve 523. An optional filter member 533 prevents solids and other debris carried in gas stream G from fouling first control valve 523. A first restrictor member 534 is disposed in first inlet conduit 531 to selectively restrict the flow of gas to first control valve 523, and allows for a variable pressure drop to be achieved in the supply chamber. A first sense line 537 is in fluid communication with a sensing chamber (not shown, but identical to sensing chamber 106 of control valve 101 of FIG. 5) first control valve 523 and a central transfer chamber (not shown, but identical to central transfer chamber 27 of FIG. 4), via a central transfer chamber tap 539, such that the pressure in the central transfer chamber may be communicated to first control valve 523. A first vent line 541 is interconnected to first sense line 537, such that pressure from the control chamber of first control valve 523 may be vented into the central transfer chamber of regulator 501.

Continuing with reference to FIG. 14, a second inlet conduit 542 is in fluid communication with a supply chamber of second control valve 525, and is interconnected to central transfer chamber tap 539, thereby placing second control valve 525 into fluid communication with the central transfer chamber of regulator 501. An optional second filter member 543 prevents solids and other debris carried in gas stream G from fouling second control valve 523. A second restrictor member 545 is disposed in second inlet conduit 542 to selectively restrict the flow of gas to a supply chamber (not shown, but identical to supply chamber 103 of control valve 101 of FIG. 5) in second control valve 525, and allows for a variable pressure drop to be achieved in the supply chamber. A first sense line 547 is in fluid communication with second control valve 525 and an outlet chamber (not shown, but identical to outlet chamber 25 of FIG. 4), via outlet flange tap 509, such that the pressure in the outlet chamber may be communicated to second control valve 525. A second vent line 549 is interconnected to second sense line 547, such that pressure from an exhaust chamber (not shown, but identical to exhaust chamber 105 of control valve 101 of FIG. 5) in second control valve 525 may be vented into the outlet chamber of regulator 501. First restrictor member 534 and second restrictor member 545 are preferably identical in form and function to restrictor member 113 of regulator 11 (see FIG. 4).

This configuration of control system 521 allows regulator 501 to perform in a working/working capacity as described above, but with this configuration, the inlet pressure to control system 521 is constant independent of fluctuations in inlet pressure. This allows control system 521 to control the outlet pressure independent of fluctuations in inlet pressure. Fluctuations in inlet pressure affect set point stability of conventional pilot-loaded regulators. A first working component generally includes first control valve 523, first throttle plate 515, first flexible diaphragm 526, and the first loading chamber. A second working component includes second control valve 525, second throttle plate 517, second flexible diaphragm 528, and the second loading chamber. In this configuration, the first working component controls the supply pressure to second control valve 525, the beneficial affect of which is the ability to control, to a constant pressure, the pressure in the central transfer chamber and the pressure to second throttle plate 517 and control valve 525, independent of actual station inlet-pressure transients. Therefore, regulator 501 will operate with a constant outlet pressure independent of inlet pressure variations. For these reasons, regulator 501 is particularly suited for use in large-volume, fixed-factor meter-station applications where control accuracy must be maintained over a wide range of inlet pressures and flow rates.

Figure 15:
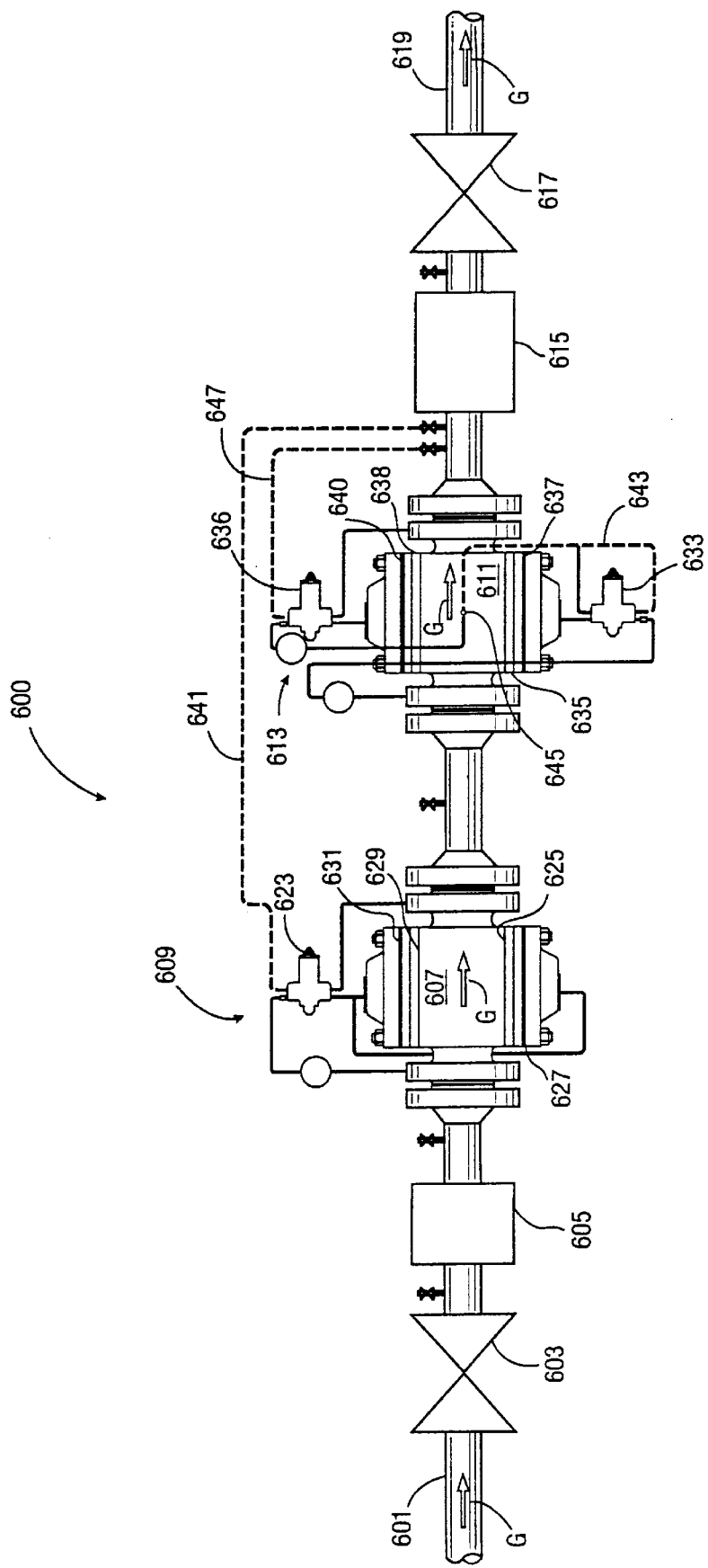
FIG. 15 is a schematic illustrating a gas-flow regulator of FIG. 4 connected in series with a gas-flow regulator similar to the regulator and control system of FIG. 14 used in a fixed-factor, high-capacity meter-station application.

Referring now to FIG. 15 in the drawings, a large-volume, fixed-factor meter station application is illustrated. Fixed-factor measurement is used to eliminate the need for meter-pressure correcting instrumentation. In order to accurately measure the flow of a gas stream without instrumentation, a meter must be placed downstream of any regulating equipment and receive a fixed pressure during operation. In a typical fixed-factor measurement station, it is necessary that the control systems not allow the control pressure, or billing pressure, to deviate by more than ±1% of absolute metering pressure. The accuracy and performance of conventional regulators used in fixed-factor measurement applications can be affected by various factors, such as regulator type and inlet pressure fluctuations. Indeed, depending upon the magnitudes of the inlet pressure variations, and the sensitivity of the regulator, many conventional regulators would be ineffective in fixed-factor measurement applications. On the other hand, the gas-flow regulator and control system of the present invention allow true and accurate fixed-factor measurement independent of inlet pressure variations.

In an assembly 600, a distribution pressure inlet 601 receives a gas stream G at a distribution pressure set by the gas company. Distribution pressure inlet 601 is connected to a conventional shut-off valve 603. A conventional filter 605, preferably a 30-mesh strainer, is installed to ensure that undesirable solids, free liquids, and other debris do not foul assembly 600. Next, a single-pilot first gas-flow regulator 607 and a first control system 609 are connected in series with a dual-pilot second gas-flow regulator 611 and a second control system 613. First regulator 607 and first control system 609 are similar to the regulator and control system of FIG. 4. However, second regulator 611 and second control system 613 are similar to the regulator and control system of FIG. 14. Downstream of first regulator 607 and second regulator 611 is a large-volume fixed-factor meter 615 for accurately measuring the flow of gas stream G through assembly 600. Fixed-factor meter 615 is then connected to a second conventional shut-off valve 617 and a fuel line pressure outlet 619.

Assembly 600 is a combination of a monitoring component provided by first regulator 607 and first control system 609; and a first working component and a separate second working component, both provided by second regulator 611 and second control system 613. Because both a first loading chamber and a second loading chamber (neither shown, but see FIG. 4) of first regulator 607 are simultaneously controlled by a control valve 623, the monitoring component generally includes control valve 623, a first throttle plate 625, a first flexible diaphragm 627, a second throttle plate 629, the first loading chamber, a second flexible diaphragm 631, and the second loading chamber. A first working component and a second working component are both provided by second regulator 611 and second control system 613. First working component generally includes a first control valve 633, a first throttle plate 635, a first flexible diaphragm 637, and a first loading chamber (not shown). In a similar manner, second working component generally includes a second control valve 636, a second throttle plate 638, a second flexible diaphragm 640, and a second loading chamber (not shown).

Control system 609 of first regulator 607 includes a first sense line 641 in fluid communication with first control valve 623. First sense line 641 of control valve 623 of first control system 609 is tapped into assembly 600 downstream of second regulator 611, but upstream of large-volume fixed-factor meter 615. Second control system 613 of regulator 611 includes a first sense line 643 in fluid communication with first control valve 633. First sense line 643 is tapped into the central transfer chamber (not shown) of regulator 611 via a central transfer chamber tap 645, thereby placing first control valve 633 into fluid communication with the central transfer chamber of regulator 611. Second control system 613 of second regulator 611 includes a second sense line 647 in fluid communication with second control valve 636. Second sense line 647 is tapped into assembly 600 downstream of regulator 611, but upstream of first sense line 641 of first control system 609.

It is preferred that the selected control pressure of the monitoring component be set incrementally higher than the selected control pressure of the second working component of regulator 611. By setting the control valves in this manner, the monitoring component will run wide open unless the second working component fails to function properly. If the second working component fails to close properly, the downstream pressure will begin to rise. If the downstream pressure rises to the selected control pressure of the monitoring component, the monitoring component will begin to throttle gas stream G and take over control of the pressure at fuel line pressure outlet 619. Because first sense line 641 of control valve 623 is located downstream of second regulator 611, the monitoring component, protects against failure of second regulator 611 or second control system 613.

In this configuration, the first working component of second regulator 611 controls the supply pressure to second control valve 636 and second throttle plate 638. The beneficial affect of which is the ability to control, to a constant pressure, the pressure in the central transfer chamber and the flow to second throttle plate 638, independent of actual station inlet-pressure transients. Therefore, second regulator 611 will operate with a constant outlet pressure independent of inlet pressure variations, thereby holding fixed-factor tolerances and providing true and accurate fixed-factor regulation.

It should be understood that the regulator and control system of the present invention may be modified to include additional control valves and pilot valves. Also, it should be apparent from the foregoing that an invention having significant advantages has been provided. While the invention is shown in only one of its forms, it is not just limited but is susceptible to various changes and modifications without departing from the spirit thereof.

We claim:

1. A regulator for use in regulating a flow of a gas stream, the regulator comprising:
   an inlet port;
   an outlet port;
   an inlet chamber in fluid communication with the inlet port and a first reduction chamber;
   an outlet chamber in fluid communication with the outlet sort and a second reduction chamber; and
   a central transfer chamber in fluid communication with the first reduction chamber and the second reduction chamber;
   the inlet chamber circumscribing the central transfer chamber;
   the outlet chamber circumscribing the central transfer chamber;
   a first throttle plate disposed between the inlet chamber and the first reduction chamber, and between the first reduction chamber and the central transfer chamber;
   a second throttle plate disposed between the outlet chamber and the second reduction chamber, and between the second reduction chamber and the central transfer chamber; and
   wherein the first throttle plate comprises:
      a plurality of mounting apertures;
      a front surface facing the inlet chamber and the central transfer chamber, and an opposing rear surface facing the first reduction chamber;
      a first arrangement of flow apertures for placing the inlet chamber in fluid communication with the first reduction chamber; and
      a second arrangement of flow apertures for placing the first reduction chamber in fluid communication with the central transfer chamber;
   wherein the second throttle plate comprises:
      a plurality of mounting apertures;
      a front surface facing the outlet chamber and the central transfer chamber, and an opposing rear surface facing the second reduction chamber;
      a first arrangement of flow apertures for placing the central transfer chamber in fluid communication with the second reduction chamber; and
      a second arrangement of flow apertures for placing the second reduction chamber in fluid communication with the outlet chamber.

2. The regulator according to claim 1, wherein a first two-stage pressure drop in the gas stream is maintained across the first throttle plate, and a second two-stage pressure drop in the gas stream is maintained across the second throttle plate, the first pressure drop and the second pressure drop being in series with each other such that a selected pressure is maintained by the regulator.

3. The regulator according to claim 1, further comprising:
   a rear seal seat in the rear surface of the first throttle plate, the rear seal seat being located radially outward from the second arrangement of flow apertures, the rear seal seat being adapted to receive a seal;
   a first front seat in the front surface of the first throttle plate, the first front seat being located between the first arrangement of flow apertures and the second arrangement of flow apertures, the first front seat being adapted to receive a seal;
   a second front seat in the front surface of the first throttle plate, the second front seat being located radially outward from the second arrangement of flow apertures, the second front seat being adapted to receive a seal;
   a rear seal seat in the rear surface of the second throttle plate, the rear seal seat being located radially outward from the second arrangement of flow apertures, the rear seal seat being adapted to receive a seal;
   a first front seal seat in the front surface of the second throttle plate, the first front seal seat being located between the first arrangement of flow apertures and the second arrangement of flow apertures, the first front seal seat being adapted to receive a seal; and a second front seal seat in the front surface of the second throttle plate, the second front seal seat being located radially outward from the second arrangement of flow apertures, the second front seal seat being adapted to receive a seal.

4. The regulator according to claim 1, wherein the gas stream flows from the inlet chamber through the first arrangement of flow apertures in the first throttle plate into the first reduction chamber, wherein the gas stream then flows parallel to the first throttle plate from the first arrangement of flow apertures in the first throttle plate toward the second arrangement of flow apertures in the first throttle plate, wherein the gas stream then flows through the second arrangement of flow apertures in the first throttle plate into the central transfer chamber; and wherein the gas stream flows from the central transfer chamber through the second arrangement of flow apertures in the second throttle plate into the second reduction chamber, wherein the gas stream then flows parallel to the second throttle plate from the second arrangement of flow apertures in the second throttle plate toward the first arrangement of flow apertures in the second throttle plate, wherein the gas stream then flows through the first arrangement of flow apertures in the second throttle plate into the outlet chamber.

5. The regulator according to claim 4, wherein the flow of the gas stream that is parallel to the first throttle plate within the first reduction chamber is toward a center of the first throttle plate from a periphery of the first throttle plate; and wherein the flow of the gas stream that is parallel to the second throttle plate within the second reduction chamber is from a center of the second throttle plate toward a periphery of the second throttle plate.

6. The regulator according to claim 1, wherein the first arrangement of flow apertures in the first throttle plate is a plurality of concentric circular arrays of circular apertures, and the second arrangement of flow apertures in the first throttle plate are formed by a central circular aperture divided into partitions or slots; and wherein the first arrangement of flow apertures in the second throttle plate is a first group of concentric circular arrays of circular apertures, and the second arrangement of flow apertures in the second throttle plate is a second group of concentric circular arrays of circular apertures or slots.

7. The regulator according to claim 1, wherein the first throttle plate comprises:

an outer circular array of outer apertures, the outer circular array of outer apertures having a selected outer array diameter, each outer aperture having an outer aperture diameter;

inner circular array of inner apertures, the inner circular array of inner apertures having a selected inner array diameter that is less than the outer array diameter, each inner aperture having an inner aperture diameter, the inner aperture diameter being less than the outer aperture diameter;

at least one intermediate circular array of intermediate apertures, the intermediate circular array of intermediate apertures having a selected intermediate array diameter that is less than the outer array diameter and greater than the inner array diameter, each intermediate aperture having an intermediate aperture diameter, the intermediate aperture diameter being less than the outer aperture diameter and greater than the inner aperture diameter, the intermediate array diameter of each successive intermediate circular array of intermediate apertures being less than the intermediate array diameter of the next outermost intermediate circular array of intermediate apertures, and greater than the intermediate array diameter of the next innermost intermediate circular array of intermediate apertures, the intermediate aperture diameter of the intermediate apertures of each successive intermediate circular array of intermediate apertures being less than the intermediate aperture diameter of the intermediate apertures of the next outermost intermediate circular array of intermediate apertures, and greater than the intermediate aperture diameter of the intermediate apertures of the next innermost intermediate circular array of intermediate apertures; and a partitioned central circular aperture having a central diameter less than the inner array diameter.

8. The regulator according to claim 7, wherein the outer circular array of outer apertures, the inner circular array of inner apertures, and each intermediate circular array of intermediate apertures are located on the first throttle plate such that the inlet chamber in fluid communication with the first reduction chamber; and wherein the central circular aperture is located on the first throttle plate such that the first reduction chamber is in fluid communication with the central transfer chamber;

whereby the gas stream flows from the inlet chamber through the outer circular array of outer apertures, the inner circular array of inner apertures, and the intermediate circular arrays of intermediate apertures into the first reduction chamber, whereby the gas stream then flows radially inward parallel to the first throttle plate toward the central circular aperture, whereby the gas stream then flows through the central circular aperture into the central transfer chamber.

9. The regulator according to claim 9, wherein the outer circular array of outer apertures, the inner circular array of inner apertures, and each intermediate circular array of intermediate apertures in the first throttle plate together selectively throttle the flow of the gas stream and maintain a two-stage first pressure drop from the inlet chamber to the first reduction chamber.

10. The regulator according to claim 1, wherein the second throttle plate comprises:

an outer circular array of outer apertures, the outer circular array of outer apertures having a selected outer array diameter, each outer aperture having an outer aperture diameter;

an inner circular array of inner apertures, the inner circular array of inner apertures having a selected inner array diameter that is less than the outer array diameter, each inner aperture having an inner aperture diameter, the inner aperture diameter being less than the outer aperture diameter;

at least one intermediate circular array of intermediate apertures, the intermediate circular array of intermediate apertures having a selected intermediate array diameter that is less than the outer array diameter and greater than the inner array diameter, each intermediate aperture having an intermediate aperture diameter, the intermediate aperture diameter being less than the outer aperture diameter and greater than the inner aperture diameter, the intermediate array diameter of each successive intermediate circular array of intermediate apertures being less than the intermediate array diameter of the next outermost intermediate circular array of intermediate apertures, and greater than the intermediate array diameter of the next innermost intermediate circular array of intermediate apertures, the intermediate aperture diameter of the intermediate apertures of each successive intermediate circular array of intermediate apertures being less than the intermediate aperture diameter of the intermediate apertures of the next outermost intermediate circular array of intermediate apertures, and greater than the intermediate aperture diameter of the intermediate apertures of the next innermost intermediate circular array of intermediate apertures; and a plurality of central circular arrays of apertures, each central circular array of apertures having a central array diameter less than the inner array diameter.

11. The regulator according to claim 10, wherein the outer circular array of outer apertures, the inner circular array of inner apertures, and each intermediate circular array of intermediate apertures are in fluid communication with the outlet chamber and the second reduction chamber, and wherein each central circular array of apertures is in fluid communication with the second reduction chamber and the central transfer chamber;

whereby the gas stream flows from the central transfer chamber, through the central circular array of apertures into the second reduction chamber, whereby the gas stream then flows radially outward and parallel to the second throttle plate toward the outer circular array of outer apertures, whereby the gas stream then flows through the outer circular array of outer apertures, the inner circular array of inner apertures, and the intermediate circular arrays of intermediate apertures into the outlet chamber.

12. The regulator according to claim 10, wherein the outer circular array of outer apertures, the inner circular array of inner apertures, and each intermediate circular array of intermediate apertures in the second throttle plate together selectively throttle the flow of the gas stream and maintain a second two-stage pressure drop from the second reduction chamber to the outlet chamber.

13. The regulator according to claim 1, further comprising:

a first diaphragm having a flat front surface located within the first reduction chamber, an opposing rear surface located within a first loading chamber, and a peripheral seal portion; and a second diaphragm having a flat front surface located within the second reduction chamber, an opposing rear surface located within a second loading chamber, and a peripheral seal portion;

the flat front surface of the first diaphragm being adapted to contact the first throttle plate, and close both the first arrangement of flow apertures and the second arrangement of flow apertures of the first throttle plate;

the flat front surface of the second diaphragm being adapted to contact the second throttle plate, and close both the first arrangement of flow apertures and the second arrangement of flow apertures of the second throttle plate.

14. The regulator according to claim 13, wherein the rear surface of the first diaphragm has a central concave portion, and the rear surface of the second diaphragm has a central concave portion.

15. The regulator according to claim 13, further comprising:

a first load means for providing a pressure load within the first loading chamber, the pressure load bearing upon the rear surface of the first diaphragm, thereby controlling an actuation of the first diaphragm and regulating the flow of the gas stream from the inlet chamber through the first reduction chamber into the central transfer chamber; and a second load means for providing a pressure load within the second loading chamber, the pressure load bearing upon the rear surface of the second diaphragm, thereby controlling an actuation of the second diaphragm and regulating the flow of the gas stream from the central transfer chamber through the second reduction chamber into the outlet chamber.

16. The regulator according to claim 1, wherein the first arrangement of flow apertures in the first throttle plate, the second arrangement of flow apertures in the first throttle plate, the first arrangement of flow apertures in the second throttle plate, and the second arrangement of flow apertures in the second throttle plate are configured such that operational noise generated by the flow of the gas stream is substantially reduced.

17. The regulator according to claim 13, further comprising:

a first actuator spring disposed within the first loading chamber, the first actuator spring being biased against a first diaphragm casing, the first actuator spring supplying a first selected preload to the rear surface of the first diaphragm; and a second actuator spring disposed within the second loading chamber, the second actuator spring being biased against a second diaphragm casing, the second actuator spring supplying a second selected preload to the rear surface of the second diaphragm.

18. The regulator according to claim 13, further comprising:

a first spacer ring disposed between the first throttle plate and the peripheral seal portion of the first diaphragm, the first spacer ring selectively locating the first diaphragm in the first reduction chamber; and a second spacer ring disposed between the second throttle plate and the peripheral seal portion of the second diaphragm, the second spacer ring selectively locating the second diaphragm in the second reduction chamber.

19. The regulator according to claim 15, wherein the first diaphragm opens from a center of the first throttle plate toward a periphery of the first throttle plate, such that the first arrangement of flow apertures in the first throttle plate is opened prior to the second arrangement of flow apertures in the first throttle plate upon a reduction in the pressure load in the first loading chamber; and wherein the second diaphragm opens from a center of the second throttle plate toward a periphery of the second throttle plate, such that the second arrangement of flow apertures in the second throttle plate is opened prior to the first arrangement of flow apertures in the second throttle plate upon a reduction in the pressure load in the second loading chamber.

20. The regulator according to claim 1, further comprising:

a control system in fluid communication with the regulator for monitoring and regulating the flow of the gas stream through the regulator.

21. A regulator for use in regulating a flow of a gas stream, the regulator comprising:

an inlet port;

an outlet port;

an inlet chamber in fluid communication with the inlet port and a first reduction chamber;

an outlet chamber in fluid communication with the outlet port and a second reduction chamber; and a central transfer chamber in fluid communication with the first reduction chamber and the second reduction chamber;

the inlet chamber circumscribing the central transfer chamber;

the outlet chamber circumscribing the central transfer chamber;

a first throttle plate disposed between the inlet chamber and the first reduction chamber, and between the first reduction chamber and the central transfer chamber;

a second throttle plate disposed between the outlet chamber and the second reduction chamber, and between the second reduction chamber and the central transfer chamber;

wherein the first throttle plate comprises:
 a plurality of mounting apertures;
 a front surface facing the inlet chamber and the central transfer chamber, and an opposing rear surface facing the first reduction chamber;
 first arrangement of flow apertures for placing the inlet chamber in fluid communication with the first reduction chamber; and
 a second arrangement of flow apertures for placing the first reduction chamber in fluid communication with the central transfer chamber;

wherein the second throttle plate comprises:
 a plurality of mounting apertures;
 a front surface facing the outlet chamber and the central transfer chamber, and an opposing rear surface facing the second reduction chamber;
 a first arrangement of flow apertures for placing the central transfer chamber in fluid communication with the second reduction chamber; and
 a second arrangement of flow apertures for placing the second reduction chamber in fluid communication with the outlet chamber;

the regulator further comprising:
 a first diaphragm having a flat front surface located within the first reduction chamber, an opposing rear surface located within a first loading chamber, and a peripheral seal portion; and
 a second diaphragm having a flat front surface located within the second reduction chamber, an opposing rear surface located within a second loading chamber, and a peripheral seal portion;
 the flat front surface of the first diaphragm being adapted to contact the first throttle plate, and close both the first arrangement of flow apertures and the second arrangement of flow apertures of the first throttle plate;
 the flat front surface of the second diaphragm being adapted to contact the second throttle plate, and close both the first arrangement of flow apertures and the second arrangement of flow apertures of the second throttle plate; and
 a closed-loop control system for supplying and regulating both the selected pressure load in the first loading chamber, and the selected pressure load in the second loading chamber.

22. The regulator according to claim 21, wherein the control system comprises:

at least one control valve having a supply chamber, a sensing chamber, an exhaust chamber, a control chamber, and a reversible pilot valve disposed between the supply chamber and the exhaust chamber;

an inlet conduit in fluid communication with the inlet chamber and the supply chamber;

a restrictor member located within the inlet conduit between the inlet chamber and the supply chamber;

a first loading conduit in fluid communication with the first loading chamber and the supply chamber;

a second loading conduit in fluid communication with the second loading chamber and the supply chamber;

a sense conduit in fluid communication with the sensing chamber; and a vent conduit in fluid communication with the outlet chamber and the exhaust chamber.

23. A single-port regulator for use in regulating a flow of a gas stream, the regulator comprising:

an inlet port;

an outlet port;

an inlet chamber in fluid communication with the inlet port and a reduction chamber;

an outlet chamber in fluid communication with the outlet port and the reduction chamber;

the outlet chamber circumscribing at least a portion of the inlet chamber;

a throttle plate disposed between the inlet chamber and the reduction chamber, and between the reduction chamber and the outlet chamber;

wherein the throttle plate comprises:
 a plurality of mounting apertures;
 a front surface facing the inlet chamber, and an opposing rear surface facing the reduction chamber;
 a first arrangement of flow apertures for placing the inlet chamber in fluid communication with the reduction chamber; and
 a second arrangement of flow apertures for placing the reduction chamber in fluid communication with the outlet chamber;

the single port regulator further comprising:
 a diaphragm having a flat front surface located within the reduction chamber, an opposing rear surface located within a loading chamber, and a peripheral seal portion;
 the flat front surface of the diaphragm being adapted to contact the throttle plate, and close both the first arrangement of flow apertures and the second arrangement of flow apertures.

24. The single-port regulator according to claim 23, wherein a first pressure drop and a second pressure drop in the gas stream are maintained across the throttle plate, the second pressure drop being in series with the first pressure drop.

25. The single-port regulator according to claim 23, wherein the rear surface of the diaphragm has a central concave portion.

26. The single-port regulator according to claim 23, further comprising:

a load means for providing a pressure load within the loading chamber, the pressure load bearing upon the rear surface of the diaphragm, thereby controlling an actuation of the diaphragm and regulating the flow of the gas stream from the inlet chamber through the reduction chamber into the outlet chamber.

27. The single-port regulator according to claim 23, further comprising:
a control system in fluid communication with the regulator for monitoring and regulating the flow of the gas stream through the regulator.

28. A method of regulating a flow of a gas stream in a pipeline system, the method comprising the steps of:
providing a regulator having an inlet port, an inlet chamber, a first reduction chamber, a central transfer chamber, a second reduction chamber, an outlet chamber, and an outlet port, the inlet chamber and the outlet chamber both completely circumscribing the central transfer chamber;
directing the flow of the gas stream from the pipeline system through the inlet port, into the inlet chamber, and around the central transfer chamber;
directing the flow of the gas stream from the inlet chamber into the first reduction chamber;
directing the flow of the gas stream from the first reduction chamber into the central transfer chamber;
directing the flow of the gas stream from the central transfer chamber into the second reduction chamber;
directing the flow of the gas stream from the second reduction chamber into the outlet chamber, around the central transfer chamber, and out through the outlet port back into the pipeline system;
further comprising the steps of:
a first diaphragm for controlling the flow of the gas stream within the first reduction chamber;
providing a first loading chamber for supplying a first loading pressure to the first diaphragm;
providing a second diaphragm for controlling the flow of the gas stream within the second reduction chamber; and
providing a second loading chamber for supplying a second loading pressure to the second diaphragm.

29. The method of claim 28, further comprising the steps of:
locating a first throttle plate between the inlet chamber and the first reduction chamber, and between the first reduction chamber and the central transfer chamber;
locating a second throttle plate between the outlet chamber and the second reduction chamber, and between the second reduction chamber and the central transfer chamber.

30. The method according to claim 29, further comprising the steps of:
maintaining a first pressure drop in the gas stream across the first throttle plate; and
maintaining a second pressure drop in the gas stream across the second throttle plate;
wherein the first pressure drop and the second pressure drop are in series with each other.

31. The method according to claim 28, wherein the step of providing a first diaphragm for controlling the flow of the gas stream within the first reduction chamber, further comprises the step of:
providing a first flexible diaphragm of non-uniform thickness, such that the first flexible diaphragm lifts from a center toward a periphery; and
wherein the step of providing a second diaphragm for controlling the flow of the gas stream within the second reduction chamber, further comprises the step of:
providing a second flexible diaphragm of non-uniform thickness, such that the second flexible diaphragm lifts from a center toward a periphery.

32. The method according to claim 29, further comprising the steps of:
locating a first arrangement of flow apertures on the first throttle plate;
locating a second arrangement of flow apertures on the first throttle plate;
locating a first arrangement of flow apertures on the second throttle plate; and
locating a second arrangement of flow apertures on the second throttle plate.

33. The method according to claim 32, wherein the gas stream is directed from the inlet chamber through the first arrangement of flow apertures in the first throttle plate into the first reduction chamber, wherein the gas stream is then directed parallel to the first throttle plate toward the second arrangement of flow apertures in the first throttle plate, wherein the gas stream is then directed through the second arrangement of flow apertures in the first throttle plate into the central transfer chamber; and
wherein the gas stream is then directed from the central transfer chamber through the second arrangement of flow apertures in the second throttle plate into the second reduction chamber, wherein the gas stream is then directed parallel to the second throttle plate toward the first arrangement of flow apertures in the second throttle plate, wherein the gas stream is then directed through the first arrangement of flow apertures in the second throttle plate into the outlet chamber;
whereby the operational noise of the regulator is substantially reduced.

34. The method according to claim 30, further comprising the steps of:
providing an adjustable closed-loop control system having at least one control valve;
wherein the steps of maintaining a first selected pressure drop in the gas stream across the first throttle plate, and maintaining a second selected pressure drop in the gas stream across the second throttle plate are achieved by selectively adjusting the closed-loop control system.

* * * * *